United States Patent
Yaman et al.

(10) Patent No.: US 12,395,244 B2
(45) Date of Patent: *Aug. 19, 2025

(54) OPTICAL FIBER EXHIBITING LOW GUIDED ACOUSTIC BRILLOUIN SCATTERING (GAWBS) NOISE AND MEASUREMENT THEREOF

(71) Applicant: NEC Laboratories America, Inc., Princeton, NJ (US)

(72) Inventors: Fatih Yaman, Princeton, NJ (US); Kohei Nakamura, Tokyo (JP); Takanori Inoue, Tokyo (JP); Eduardo Mateo Rodriguez, Tokyo (JP); Shinsuke Fujisawa, Princeton, NJ (US); Hussam Batshon, Neptune, NJ (US); Yoshihisa Inada, Tokyo (JP); Takaaki Ogata, Tokyo (JP)

(*) Notice: Subject to any disclaimer, the term of this patent is extended or adjusted under 35 U.S.C. 154(b) by 931 days.

This patent is subject to a terminal disclaimer.

(21) Appl. No.: 17/540,132

(22) Filed: Dec. 1, 2021

(65) Prior Publication Data

US 2022/0173808 A1 Jun. 2, 2022

Related U.S. Application Data

(60) Provisional application No. 63/141,068, filed on Jan. 25, 2021, provisional application No. 63/120,357, filed on Dec. 2, 2020.

(51) Int. Cl.
*H04B 10/07* (2013.01)
*H01S 3/30* (2006.01)
*H04B 10/2537* (2013.01)
*H04B 10/291* (2013.01)
*H04B 10/61* (2013.01)

(52) U.S. Cl.
CPC ........ *H04B 10/2537* (2013.01); *H01S 3/302* (2013.01); *H04B 10/2916* (2013.01); *H04B 10/07* (2013.01); *H04B 10/61* (2013.01)

(58) Field of Classification Search
CPC ............ H04B 10/2537; H04B 10/2916; H04B 10/07; H04B 10/61; H01S 3/302; G01M 11/331
USPC ....................................... 398/9–38, 202–214
See application file for complete search history.

(56) References Cited

U.S. PATENT DOCUMENTS

| | | | | |
|---|---|---|---|---|
| 4,965,858 A | * | 10/1990 | Naito .................... | H04B 10/61 398/205 |
| 2003/0156275 A1 | * | 8/2003 | Baney .................... | G01M 11/33 356/73.1 |

(Continued)

*Primary Examiner* — Dibson J Sanchez
(74) *Attorney, Agent, or Firm* — Joseph Kolodka

(57) ABSTRACT

Aspects of the present disclosure describe systems, methods, and structures in which guided acoustic Brillouin (GAWBS) noise is measured using a homodyne measurement technique and demonstrated using a number of optical fibers, such fibers being commonly used in contemporary optical communications systems. The measurements are made with single spans and determined to be consistent with separate multi-span long-distance measurements. Additionally, a technique for preparing an optical fiber exhibiting superior GAWBS noise characteristics by reducing coherence length of the optical fiber by spinning the fiber at a high rate during the drawing process such that birefringence coherence length is reduced.

12 Claims, 18 Drawing Sheets

(56) References Cited

U.S. PATENT DOCUMENTS

| | | | |
|---|---|---|---|
| 2009/0142069 A1* | 6/2009 | Wree | H04B 10/60 398/147 |
| 2009/0214201 A1* | 8/2009 | Oda | H04B 10/6971 398/25 |
| 2012/0057863 A1* | 3/2012 | Winzer | H04B 10/60 398/1 |
| 2014/0341564 A1* | 11/2014 | Westlund | H04B 10/0731 398/16 |
| 2016/0094297 A1* | 3/2016 | Xie | H04L 7/027 398/202 |
| 2016/0146869 A1* | 5/2016 | Marsland, Jr. | H04B 10/63 324/76.77 |
| 2017/0134097 A1* | 5/2017 | Morie | H04B 10/61 |
| 2018/0234184 A1* | 8/2018 | Tanimura | H04B 10/079 |
| 2020/0149878 A1* | 5/2020 | Zadok | G01B 11/18 |
| 2021/0306073 A1* | 9/2021 | Yoshida | H04B 10/6161 |
| 2023/0088679 A1* | 3/2023 | Noto | G01H 9/004 73/655 |

* cited by examiner

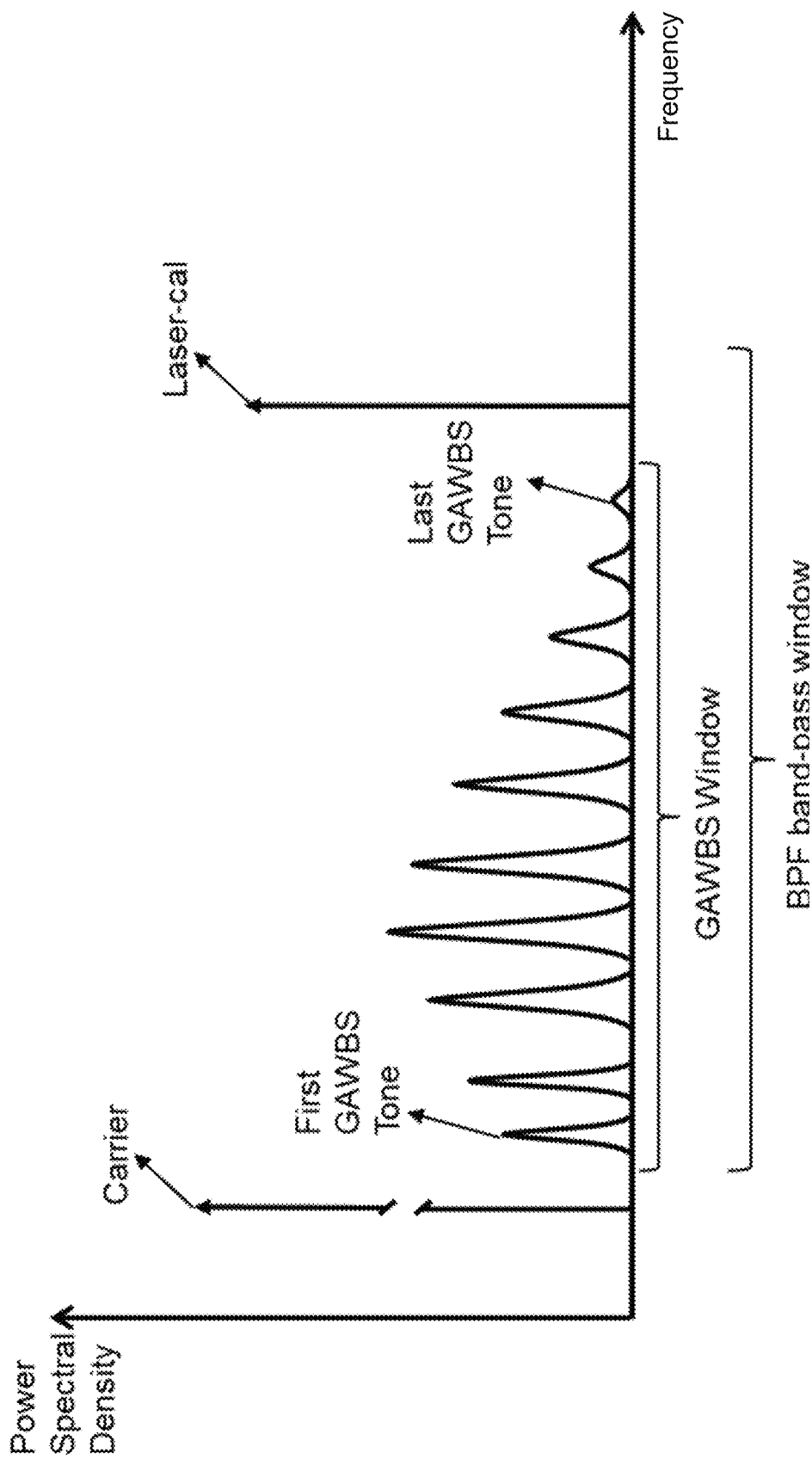

OPTICAL FIBER EXHIBITING LOW GUIDED ACOUSTIC BRILLOUIN SCATTERING (GAWBS) NOISE AND MEASUREMENT THEREOF

CROSS REFERENCE TO RELATED APPLICATIONS

This application claims the benefit of U.S. Provisional Patent Application Ser. No. 63/120,357 filed 2 Dec. 2020 and U.S. Provisional Patent Application Ser. No. 63/141,068 filed 25 Jan. 2021 the entire contents of each is incorporated by reference as if set forth at length herein.

TECHNICAL FIELD

This disclosure relates generally to optical communications systems, methods, and structures. More particularly, it describes optical fiber systems, methods, and structures exhibiting low guided acoustic Brillouin scattering (GAWBS) noise and measurement thereof.

BACKGROUND

As is known in the optical communications arts—and generally—optical signals are transmitted over optical fibers. Modern optical fibers are very good at transmitting optical signals without causing large distortions or attenuation to the signal. In other words, they retain a signal to noise ratio (SNR) quite well. Notwithstanding, there exist several noise sources. One of which—GAWBS—is a physical process that contributes to degrading optical signal quality.

SUMMARY

An advance in the art is made according to aspects of the present disclosure directed to a homodyne arrangement for measuring GAWBS in optical fiber.

In sharp contrast to the prior art, systems, methods, and structures according to the present disclosure employ a a polarization diversity receiver that simultaneously measures all polarization components of GAWBS noise, and a secondary laser is used to automatically calibrate the noise power.

A first tunable laser with a nominal linewidth of 100 kHz emits light that is split into two parts. One part combines with light emitted from a second tunable laser and is directed into/through a fiber under test (FUT). After the FUT the light is amplified, and a 50 GHz filter centered around the laser frequency removes ASE noise. After the filter the laser light is directed into a signal port of a phase and polarization diversity hybrid. Light emitted from the first tunable laser that is not combined is directed via a polarization maintaining coupler (fiber) to a LO port of the hybrid. Subsequent to the hybrid, four photodetectors receive in-phase and out-of-phase beating between two orthogonal components of the hybrid inputs. Finally, band-pass filters (BPFs) are employed rejects noise outside of the range between 20 MHz to 1000 MHz to avoid ASE noise folding back in to the Nyquist band, and also to reject high carrier power. An analog to digital converter samples/converts the band-pass filtered signals. High extinction ratio polarization maintaining fibers and couplers are used to combine the two lasers to make sure they remain in the same polarization.

Viewed from yet another aspect, the present disclosure is directed to an inventive technique for preparing an optical fiber exhibiting superior GAWBS noise characteristics by reducing coherence length of the optical fiber by spinning the fiber at a high rate during the drawing process such that birefringence coherence length is reduced.

BRIEF DESCRIPTION OF THE DRAWING

A more complete understanding of the present disclosure may be realized by reference to the accompanying drawing in which:

FIG. 12 is a schematic diagram showing illustrative measurement settings according to aspects of the present disclosure.

Figure 1:
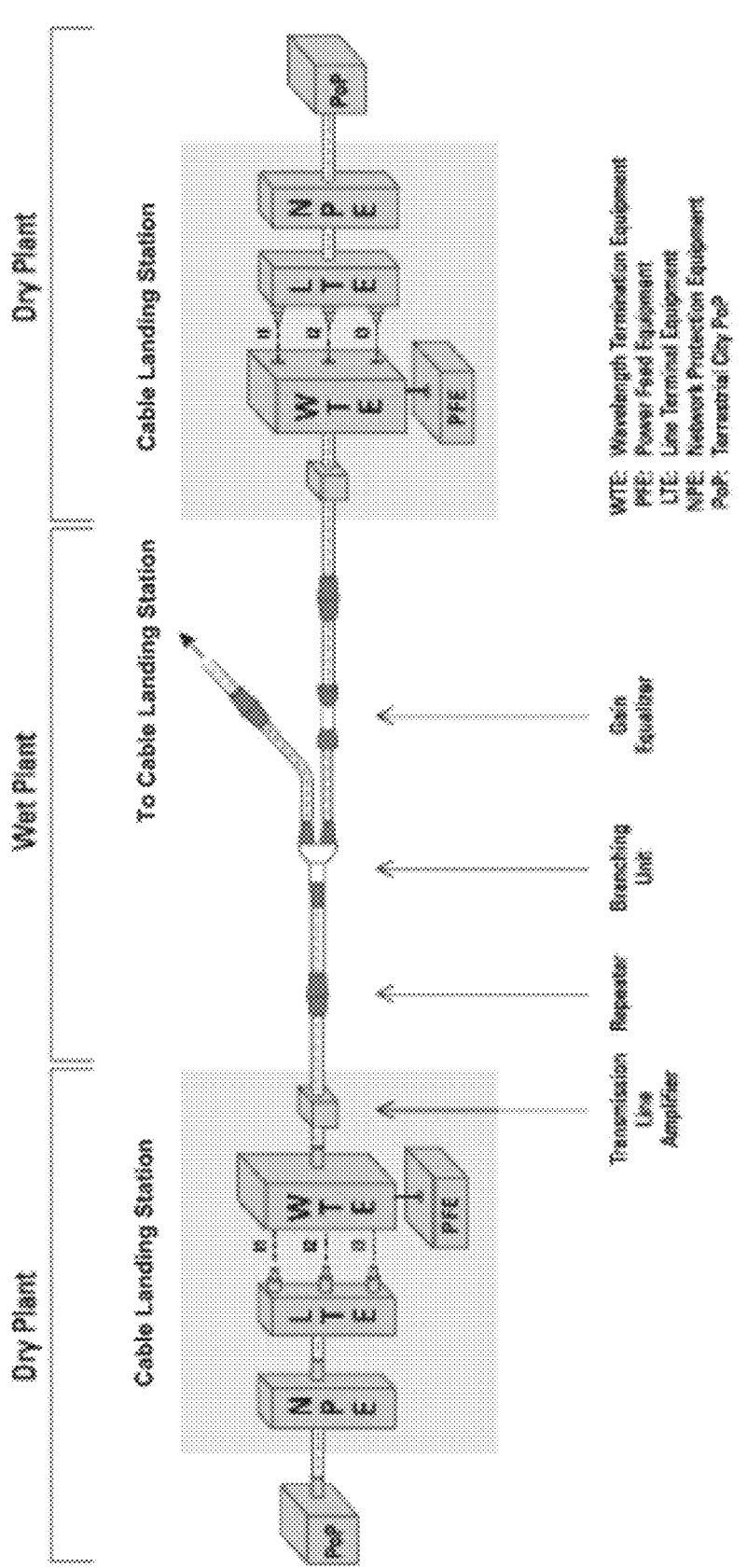
FIG. 1 is a schematic diagram of a submarine optical fiber cable system as is known in the art.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

Introduction

By way of some additional background, we begin by noting once more that guided acoustic Brillouin scattering (GAWBS) is a physical process that occurs in optical fibers used for carrying optical telecommunications signals which adds distortion, or noise to the signals. The level (amount) of this distortion depends on the design and also the physical parameters of the optical fibers. Those skilled in the art will know and understand that many of the physical parameters of optical fibers that affect the level of GAWBS also affect other transmission properties of the fibers such as its attenuation, dispersion, nonlinearity, polarization mode dispersion, micro- and macro-bending loss, single-modedness etc.,—which also significantly affect signal quality. As an example, increasing the core diameter or, more specifically, effective area of a fiber reduces GAWBS distortion however, beyond a certain point it also results in macro-bending loss and modal dispersion, or multi-path interference. As such, decreasing GAWBS in an optical transmission system without increasing distortion from other mechanisms remains a difficult problem.

Application Example:

An illustrative and important optical communication system that employs optical fiber and is susceptible to GAWBS is an undersea, submarine, optical communication system having several spans.

As those skilled in the art will readily understand and appreciate, submarine systems including optical fiber cables are the true backbone of global communications. Nearly all inter-continental data is delivered through submarine cables that are laid on the seabed floor. As a result, contemporary high bandwidth services and applications including World-Wide-Web, cloud computing, fifth generation (5G) wireless networks, and those involving virtual reality.

As those skilled in the art will understand and appreciate further, there are many aspects of a submarine transmission system that distinguishes it from other optical fiber communication systems. First, they are very long, as they oftentimes connect different continents. Second, it is very expensive to lay optical fiber cables under water. Once the cable is laid it is extremely expensive to replace, upgrade, or repair the cables. Accordingly, even small degradations reduce the available transmission capacity.

As noted, one such source of degradation is GAWBS. The level of GAWBS depends on certain physical parameters of the optical fiber employed in addition to certain design parameters. Examples of physical parameters that affect GAWBS include the photo-elastic coefficient of the glass comprising the optical fiber, longitudinal and shear velocity of sound in the glass, the glass density, and operation temperature, etc. Examples of design parameters that affect GAWBS, include the cladding diameter, the effective area and the core-cladding refractive index difference and the choice of polymer coating are some of the parameters that affect the level of GAWBS. The impact of these parameters—since they are well known—have been been optimized to avoid larger penalties from other sources such as attenuation, purity of spatial mode, tolerance to bending etc.

FIG. 1 is a schematic diagram of an illustrative submarine cable system known in the art. With reference to that figure, data to be transmitted originates in one of the cable landing stations. It is delivered to other cable stations across the sea through the submarine cable. Submarine cables have mainly two parts. 1) The cable span, 2) repeaters.

Each cable span can be 40 km to 150 km—or longer—but typically are in the 50-80 km range. As is shown in the figure a cable span typically includes several elements including fiber optic cable, repeater(s), branching unit(s), and amplifier(s). For our purposes of this immediate discussion, we are most concerned with the optical fiber cables.

As is known, optical fibers are thin strands of glass that can guide light within them while imparting a low attenuation. Optical fibers are typically about 250 microns diameters, are made of a pure silica glass and exhibit a substantially cylindrical shape. Light is guided through a doped center (core) that is surrounded by a cladding configured to result in a total internal reflection of the guided light. Typically, the core diameter is on the order of 5-12 micrometers, and the cladding diameter is about 125 micrometers. The glass may be further coated by protective polymers bringing the overall diameter of an optical fiber to about 250 micrometers. Optical cables include many such fibers. The data capacity of an optical cable is therefore proportional to the number of fibers in the cable. For undersea applications despite favorable optical fiber transmission efficiencies amplification is required, and such amplifiers are typically housed in repeaters located at pre-determined locations of an undersea cable. Typically, there is at least one amplifier dedicated to a single fiber in each repeater. Unfortunately, amplifiers add noise during amplification.

Figure 2:
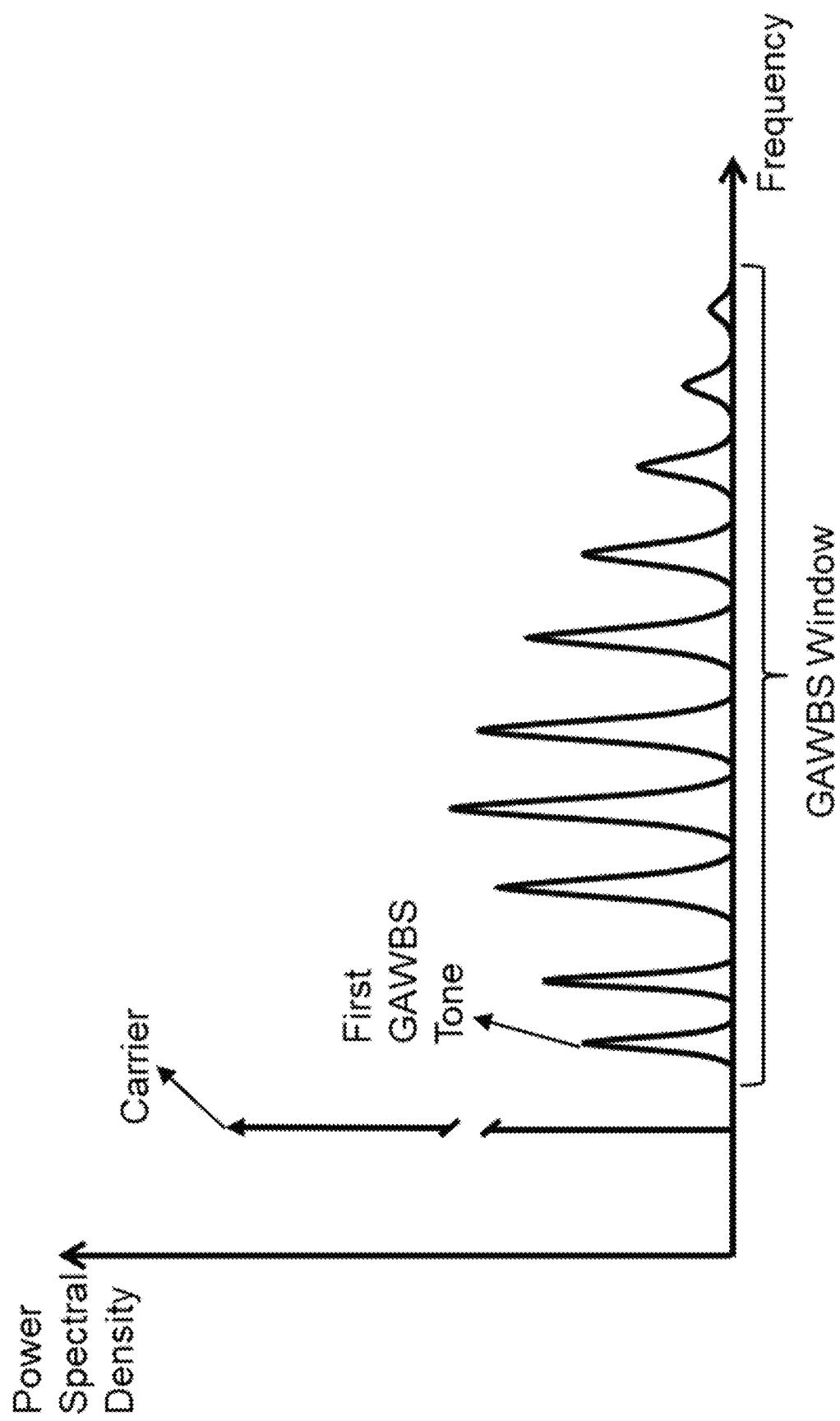
FIG. 2 is a plot of a GAWBS spectrum according to aspects of the present disclosure.

Of interest to our disclosure, GAWBS is known to be caused by acoustic vibrations in the glass fibers. Due to the ambient temperature, there is constant vibrations in the glass fibers that keep bouncing back and forth between the outer boundaries of the glass, mainly the circumference, as the two ends of the fibers are typically very far. Because of the finite size of the glass fibers, these vibrations occur in modes. Considering the speed of sound in glass about 5800 m/s and the diameter of the glass about 125 μm these vibrations modes (particularly the symmetric dilational modes) have a frequency separation of the order of 40 MHz with the fundamental frequency around 30 MHz. These acoustic vibrations cause modulation of the refractive index at the location where the light is passing through. This refractive index modulation in turn causes the phase of the light to be modulated at the same frequency of the acoustic modes. This phase modulation presents itself as the source of the degradation. Even though the level of modulation in the refractive index and hence in the optical phase is miniscule, it adds up to significant levels after thousands of kilometers. As an example, if we send a laser with no modulation on it, i.e., a continuous wave laser through a fiber and look at its spectrum, we expect to see something like that shown schematically in FIG. 2 which shows a plot of a GAWBS spectrum wherein a carrier is a laser light sent to a fiber under test. The broken line is indicative that the carrier is much larger than GAWBS tones. Note further that side tones generated by GAWBS are much smaller than the carrier, i.e., the cw laser. These GAWBS tones act as additional noise when the laser is modulated by data.

Figure 3:
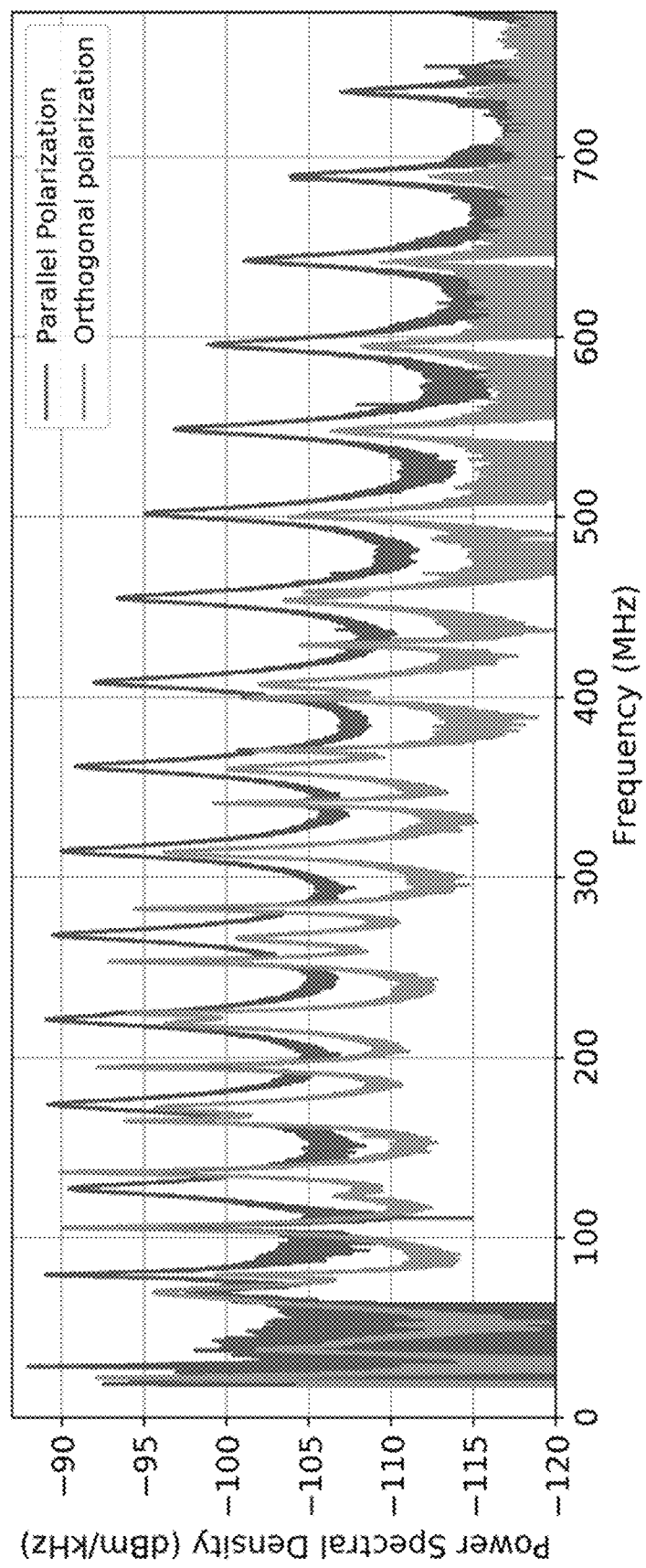
FIG. 3 is a plot of a measured GAWBS spectrum after 84 km of single mode fiber with an effective area of 110 $\mu m^2$, according to aspects of the present disclosure.

FIG. 3 is a plot showing a measured GAWBS spectrum after 84 km of single-mode fiber with an effective area of 110 μm². Note that GAWBS generates noise in both polarizations one parallel to the input and a lesser amount in orthogonal polarization. In this plot, the carrier is removed.

Note that FIG. 3 shows an actual measurement result, showing how small the contribution is from a single span of fiber. The GAWBS creates noise in both positive and negative frequencies with respect to the carrier, however they are perfectly symmetric so only one-sided spectrum is shown.

Theoretical Background for GAWBS Spectrum and How it is Related to the Mode Field Distribution in the Fiber GAWBS is generated by transverse acoustic modes in the fiber. These modes do not have any longitudinal components, which means they only generate forward scattering. The acoustic frequencies allowed by a given fiber can be found through solving the following characteristic equation for:

$$|B|=0 \quad (5)$$

where |·| stands for determinant and B is 2×2 matrix given by $$\begin{bmatrix} \left(n^2 - 1 - \frac{y^2}{2}\right) J_n(\alpha y) & \left(n(n^2 - 1) - \frac{y^2}{2}\right) J_n(y) - \\ & (n^2 - 1) y J_{n+1}(y) \\ (n-1) J_n(\alpha y) - \alpha y J_{n+1}(\alpha y) & \left(n(n-1) - \frac{y^2}{2}\right) J_n(y) + y J_{n+1}(y) \end{bmatrix} \quad (6)$$

where $y=2\pi f\alpha/V_s$, $\alpha=V_s/V_d$, $V_s$ is the shear sound velocity, $V_d$ is the longitudinal sound velocity, and f is the vibration frequency sound wave, $\alpha$ is the fiber cladding radius, and n is an integer that denotes solutions for different acoustic mode groups. For each n, Eqs(5-6) has discrete solutions that can be numbered as integers m.

The acoustic modes can be described by the displacement vector fields for these modes which are given by:

$$U_r(r, t) = \quad (7)$$
$$C_{nm} \frac{y_{nm}}{a} \left\{ -A_2 \left[ \frac{an}{r} J_n\left(\frac{\alpha y_{nm} r}{a}\right) - \alpha J_{n+1}\left(\frac{\alpha y_{nm} r}{a}\right) \right] + A_1 \frac{na}{r} J_n\left(\frac{y_{nm} r}{a}\right) \right\}$$
$$\cos(n\varphi)\sin(\Omega_{nm} t)$$

-continued
$$U_\varphi(r, t) = C_{nm} \frac{y_{nm}}{a} \left\{ -A_1 \left[ \frac{an}{r} J_n\left(\frac{y_{nm} r}{a}\right) - J_{n+1}\left(\frac{y_{nm} r}{a}\right) \right] + A_1 \frac{na}{r} J_n\left(\frac{\alpha y_{nm} r}{a}\right) \right\}$$
$$\cos(n\varphi)\sin(\Omega_{nm} t)$$

where $A_1=nB_{11}, A_2=B_{12}$, $\overline{U}=[U_r, U_\varphi, 0]$ is the displacement vector field in cylindrical coordinates defined by radial, and angular coordinates r and $\varphi$, respectively, and $C_{nm}$ is the amplitude of the corresponding mode, $\Omega_{nm}=2\pi f_{nm}$, $f_{nm}$ are the discrete frequencies that satisfy the characteristic equation given by Eq.(6). Note that we may drop the time dependent portion when opt relevant.

The acoustic vibrations cause a strain tensor in the cross plane of the fiber which in turn creates modulation of the refractive index of the fiber. The non-zero strain tensor components can be found by the following relations:

$$S_{rr} = \frac{\partial U_r}{\partial r} \quad (8)$$
$$S_{\varphi\varphi} = \frac{1}{r}\frac{\partial U_\varphi}{\partial \varphi} + \frac{U_r}{r}$$
$$S_{r\varphi} = \frac{1}{2}\left(\frac{1}{r}\frac{\partial U_r}{\partial \varphi} + \frac{\partial U_\varphi}{\partial r} - \frac{U_\varphi}{r}\right)$$

Note that tensor components in z axis is zero. Inserting Eq(7) into Eq(8), we obtain $$S_{rr} = \quad (9)$$
$$C_{nm}\left(\frac{y_{nm}}{a}\right)^2 \left\{ -A_2\left[\frac{n(n-1)}{\rho} J_n(\alpha\rho) - \frac{(2n+1)\alpha}{\rho} J_{n+1}(\alpha\rho) + \alpha^2 J_{n+2}(\alpha\rho)\right] + A_1\left[\frac{n(n-1)}{\rho^2} J_n(\rho) - \frac{n}{\rho} J_{n+1}(\rho)\right]\right\} \cos n\varphi$$

$$S_{\varphi\varphi} = C_{nm}\left(\frac{y_{nm}}{a}\right)^2 \frac{1}{\rho}\left\{ A_2\left[\frac{n}{\rho} J_n(\alpha\rho) + \alpha J_{n+1}(\alpha\rho)\right] - A_1\left[\frac{n}{\rho} J_n(\rho) - 2J_{n+1}(\rho)\right]\right\} \cos n\varphi$$

$$S_{r\varphi} = C_{nm}\left(\frac{y_{nm}}{a}\right)^2 \frac{1}{2\rho}\left\{ A_2\left[\frac{n^2}{\rho} J_n(\alpha\rho) - (n+2)\alpha J_{n+1}(\alpha\rho)\right] - A_1\left[\frac{n^2}{\rho} J_n(\rho) - 2n J_{n+1}(\rho) + \rho J_{n+2}(\rho)\right]\right\} \sin n\varphi$$

where $\rho=y_{nm}r/a$. In order to find the level of change in the refractive index due to the strain induced by the acoustic vibrations we use the photo-elastic relation for isotropic materials in the reduced notation that relates the strain tensor to the impermeability tensor as follows which is given in the Cartesian coordinates as follows.

$$\begin{bmatrix} \Delta\eta_{xx}(r, \varphi) \\ \Delta\eta_{yy}(r, \varphi) \\ \Delta\eta_{zz}(r, \varphi) \\ \Delta\eta_{yz}(r, \varphi) \\ \Delta\eta_{xz}(r, \varphi) \\ \Delta\eta_{xy}(r, \varphi) \end{bmatrix} = \quad (10)$$

-continued $$\begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{11}-p_{12} & 0 & 0 \\ 0 & 0 & 0 & 0 & p_{11}-p_{12} & 0 \\ 0 & 0 & 0 & 0 & 0 & p_{11}-p_{12} \end{bmatrix} \begin{bmatrix} S_{xx}(r,\varphi) \\ S_{yy}(r,\varphi) \\ S_{zz}(r,\varphi) \\ S_{yz}(r,\varphi) \\ S_{xz}(r,\varphi) \\ S_{xy}(r,\varphi) \end{bmatrix}$$

wherein $$\Delta\eta_{ab}(r,\varphi) = \Delta\left(\frac{1}{\varepsilon_{ab}(r,\varphi)}\right) \approx -\frac{\Delta\varepsilon_{ab}(r,\varphi)}{\varepsilon_{ab}^2} \quad (11)$$

and $\varepsilon_{ab}$ are the components of the dielectric permittivity tensor, and the approximation on the right holds for small changes in the dielectric permittivity as is the case for GAWBS. From Eq.(10) we obtain $\Delta\eta_{xx}(r,\varphi) = p_{11}S_{xx} + p_{12}S_{yy}$ $\Delta\eta_{yy}(r,\varphi) = p_{12}S_{xx} + p_{11}S_{yy}$ $\Delta\eta_{xy}(r,\varphi) = (p_{11}-p_{12})S_{xy}$  (12)

We can write the strain tensor from the Cartesian coordinates to the cylindrical coordinates as follows:

$S_{xx} = (\cos\varphi)^2 S_{rr} + (\sin\varphi)^2 S_{\varphi\varphi} - \sin 2\varphi S_{r\varphi}$ $S_{yy} = (\sin\varphi)^2 S_{rr} + (\cos\varphi)^2 S_{\varphi\varphi} + \sin 2\varphi S_{r\varphi}$ $S_{xy} = \sin 2\varphi (S_{rr} - S_{\varphi\varphi})/2 - \cos 2\varphi$  (13)

Inserting Eq.(13) into Eq.(12) we can write the impermeability tensor components as follows:

$$\Delta\eta_{xx}(r,\varphi) = \frac{p_{11}+p_{12}}{2}(S_{rr}+S_{\varphi\varphi}) + \frac{p_{11}-p_{12}}{2}[(S_{rr}-S_{\varphi\varphi})\cos 2\varphi - 2S_{r\varphi}\sin 2\varphi]$$

$$\Delta\eta_{yy}(r,\varphi) = \frac{p_{11}+p_{12}}{2}(S_{rr}+S_{\varphi\varphi}) - \frac{p_{11}-p_{12}}{2}[(S_{rr}-S_{\varphi\varphi})\cos 2\varphi - 2S_{r\varphi}\sin 2\varphi]$$

$$\Delta\eta_{xy}(r,\varphi) = \frac{p_{11}+p_{12}}{2}[(S_{rr}-S_{\varphi\varphi})\sin 2\varphi - 2S_{r\varphi}\cos 2\varphi]$$ (14)

Note that the expression for $\Delta\eta_{ab}(r,\varphi)$ can be separated into two parts each of which only depends on r or $\varphi$. This can be noted by looking at Eq.(14) where the terms dependent on $\varphi$ are explicit, and moreover, it is clear from Eq.(9) that the strain tensor components can be separated into two parts that only depends on r or $\varphi$. We will do this more explicitly by employing the following definition:

$S_{rr}(r,\varphi) = s_{rr}(r)\cos 2\varphi$ $S_{\varphi\varphi}(r,\varphi) = s_{\varphi\varphi}(r)\cos 2\varphi$ $S_{r\varphi}(r,\varphi) = s_{r\varphi}(r)\sin 2\varphi$  (15)

We will relate the changes in the permeability tensor to the refractive index changes. Eq.(14) describes how the impermeability tensor components vary across the fiber cross section due to the acoustic vibrations. In general, such spatial variations in the refractive index distribution would scatter the signal travelling in the fiber into all the modes supported by the optical fiber and radiation modes. When the index modulations are very small, power lost these scattering would be negligible, and not of interest to us. The non-negligible contribution would be to optical signal coupling into the modes supported by the fiber in the absence of acoustic vibrations. Though this analysis can be extended to multi-mode fibers, here we will limit the analyses to single moded fibers. In this case the available modes are the two orthogonal polarization modes. We can expand the optical field in these two modes as follows:

$\vec{E}(r,z,t) = f(r)[h_x(z)\hat{e}_x + h_y(z)\hat{e}_y]e^{i(kz-\omega t)}$  (16)

In Eq.(16) we expanded the electric field of the optical mode in terms of the two polarization modes aligned along the unit vectors $\hat{e}_x$ and $\hat{e}_y$. Here the assumption is that the fiber is single moded with a propagation constant of $k = n_0 k_0 = 2\pi n_0/\lambda$, where $n_0 = \sqrt{\varepsilon}$ is the refractive index of the fiber without the acoustic perturbation, and $\varepsilon$ is the corresponding dielectric permittivity, and $k_0$ is the Fiber's intrinsic anisotropy is neglected, and same propagation constant is assumed for both polarization modes. Moreover, it is assumed that both polarizations have the same mode field distribution in the transverse direction f(r).

Note that, in Eq.(16), the longitudinal component of the optical mode is not included even though in general it is not zero, even though it is typically small. This is warranted as the z-components of the permeability tensors vanish anyways since the acoustic modes we are looking are transverse modes. However, because of the acoustic vibrations, the evolution of the two polarizations along the fiber, i.e., in the z-axis is given by two separate functions, which allows for coupling of the two polarizations components to one another as well back to themselves. The coupled mode equations for the optical mode can be written as follows:

$$\frac{\partial h_a(z)}{\partial z} = i\sum_{b=x,y} \kappa_{ij} h_j(z),$$  (17)

$a = x, y,$ $i = \sqrt{-1}$ where the coupling coefficients $\kappa_{ij}$ are given by:

$$\kappa_{ab} = \frac{k_0}{2\sqrt{\varepsilon}} \frac{\int_0^{2\pi}\int_0^{\infty} \Delta\varepsilon_{ab}(r,\varphi)f(r^2)rdrd\varphi}{\int_0^{2\pi}\int_0^{\infty} f(r^2)rdrd\varphi}$$  (18)

$a, b = x, y$

As we now note, Eq.(17) is a central relationship of our disclosure. One can see that the coupling coefficients are just a normalized overlap integral between the optical mode field distribution and the strain distribution caused by the acoustic vibrations. Since we know the strain distribution generated by the acoustic vibrations as shown in Eq.(9), through we would know their overlap with the optical mode field.

We can rewrite Eq.(18) as follows by using the definition in Eq.(15):

$\kappa_{xx} \propto p_p \int_0^{2\pi} \cos(n\varphi)d\varphi \int_0^{\infty}(S_{rr}+S_{\varphi\varphi})f(r)^2 dr + p_m \int_0^{2\pi} \cos(n\varphi)\cos(2\varphi)d\varphi \int_0^{\infty}(S_{rr}-S_{\varphi\varphi})f(r)^2 dr + 2p_m \int_0^{2\pi} \sin(n\varphi)\sin(2\varphi)d\varphi \int_0^{\infty} s_{r\varphi}f(r)^2 dr$  (19)

$\kappa_{yy} \propto p_p \int_0^{2\pi} \cos(n\varphi)d\varphi \int_0^{\infty}(S_{rr}+S_{\varphi\varphi})f(r)^2 dr - p_m \int_0^{2\pi} \cos(n\varphi)\cos(2\varphi)d\varphi \int_0^{\infty}(S_{rr}-S_{\varphi\varphi})f(r)^2 dr + 2p_m \int_0^{2\pi} \sin(n\varphi)\sin(2\varphi)d\varphi \int_0^{\infty} s_{r\varphi}f(r)^2 dr$  (20)

$\kappa_{xy} \propto p_m \int_0^{2\pi} \cos(n\varphi)\sin(2\varphi)d\varphi \int_0^{\infty}(S_{rr}-S_{\varphi\varphi})f(r)^2 rdr - 2p_m \int_0^{2\pi} \sin(n\varphi)\cos(2\varphi)d\varphi \int_0^{\infty} s_{r\varphi}f(r)^2 rdr$  (21)

where $p_p=(p_{11}+p_{12})/2$, and $p_m=(p_{11}-p_{12})/2$, and only the integration in numerator in Eq.(18) is shown as the integral in denominator just a normalization factor by the total power in the optical mode. We can see that in Eq.(21), which creates coupling between the two polarizations, all the integrals over φ (angular integrals) vanishes for any integer n. This is only true when we choose the x- and y-polarizations in the same axis defined by the angle φ.

Angular integrals in Eq.(19-20) do not vanish only for two values of n: n=0, and n=2. For n=0, the angular integrals in the first terms on the right is just $2\pi$ as the cosine term is just 1, for both Eqs.(17) and (18). However, the angular integrals in the second and third terms vanish. For the case of n=2, on the other hand, the first terms on the right vanish, and the second and third angular integrals are just $\pi$. Therefore we can simplify Eqs.(19-20) as follows:

n = 0:

$$\kappa_{yy} = \kappa_{xx} = \kappa_p = \frac{k_0 n_0^3}{2} \frac{p_p \int_0^\infty (s_{rr}+s_{\varphi\varphi})f(r^2)rdr}{\int_0^\infty f(r^2)rdr} \quad (22)$$

n = 2:

$$-\kappa_{yy} = \kappa_{xx} = \kappa_u = \frac{k_0 n_0^3}{4} \frac{p_m \int_0^\infty (s_{rr}-s_{\varphi\varphi}+2s_{r\varphi})f(r^2)rdr}{\int_0^\infty f(r^2)rdr}$$

where we used the approximation in Eq.(11) and the definition $n_0=\sqrt{\varepsilon}$.

Combining Eqs.(16,17,20) we obtain:

n=0: $\vec{E}(r,z,t)=f(r)[h_x(0)\hat{e}_x+h_y(0)\hat{e}_y]e^{-i(kz-\omega t)}e^{ik_p(t)z}$ n=2:

$$\vec{E}(r,z,t)=f(r)[h_x(0)e^{ik_u(t)z}\hat{e}_x+h_y(0)e^{ik_u(t)z}\hat{e}_y]e^{-i(kz-\omega t)} \quad (23)$$

We can see from Eq.(23) that in the case of n=0, optical field only experiences a phase modulation since the phase shift is the same for both polarizations. Therefore, the GAWBS peaks created by n=0 mode group which is also denoted as the $R_{0m}$ modes create only GAWBS peaks that are in the same polarization as the input optical field. Incidentally, these modes are called the radial modes, as they only generate vibrations in the form of radial dilation, and contraction. For the case of n=2, optical field experiences linear birefringence, in particular when the optical field has equal power in both x- and y-polarizations defined by the angle φ, the field experiences pure birefringence, and therefore GAWBS peaks occur orthogonal to the input optical field. When the input field is only in x-polarization or only in y-polarization, then the optical field again experience only a pure phase modulation.

Since—in general—the optical field polarization may be in random orientation, GAWBS peaks of both polarizations are created. Therefore, these GAWBS peaks are also known as unpolarized GAWBS. Nevertheless, as we will show later that unpolarized does not mean zero degree of polarization. The acoustic mode group of n=2 is also given the name $TR_{2m}$, known as torsional-rotational modes.

In Eq.(23), we explicitly retain the time dependence of the coupling coefficients, since these coefficients are created by acoustic modes vibrating at frequencies. These frequencies can be found from Eq.(6). n=0, $$\left[\frac{y^2}{2}J_0(y)-yJ_1(y)\right]\left[\frac{y^2}{2}J_0(\alpha y)-\alpha y J_1(\alpha y)\right]=0 \quad (24)$$

which results in two separate equations. The solutions of the equation in the first parenthesis belong to the mode group that is pre radial shear waves. Incidentally, the equation in the first parenthesis can be reduced to roots of the second order Bessel function. Shear waves do not contribute to GAWBS. This is because pure shear waves $U_r=0$, and, $U_\varphi(r)$ is a function of r only. Therefore it only produces off-diagonal strain, i.e., $S_{r\varphi}$, with no φ dependence. Looking at Eqs.(19-21) all the angular integrals would vanish under these conditions.

The solution to the equation in the second parenthesis belong to the pure radial dilational modes. We can find the acoustic frequencies satisfying this equation by relating them to the $\alpha y_{0m}$, that satisfied this equation as follow:

$$f_{0m}=\frac{y_{0m}V_d}{2\pi a} \quad (25)$$

where $$y=\frac{2\pi f a}{V_s},$$

$$\alpha=V_s/V_d.$$

The frequencies of the $TR_{2m}$ modes can also be find in a similar fashion from Eq.(6) by setting n=2. If the fiber core is concentric with the fiber cladding, only two mode groups contributes to the generation of the GAWBS spectrum: n=0 which is responsible for the so called-radial modes $R_{0m}$, and: n=2, which is responsible for the torsional-rotational modes $TR_{2m}$. Therefore we find that the acoustic modes vibrate at discrete frequencies, which in turn, generates strain in the fiber cross-section, and that in turn generates perturbation in the dielectric tensor, which causes coupling as shown in Eqs.(22-23). Since the coupling coefficients vary sinusoidally, they create side tones at the vibration frequencies.

To find the magnitude of these side tones, We use Eq.(23), and show the time dependence portion explicitly:

n=0: $\vec{E}(r,l,t)=f(r)[h_x(0)\hat{e}_x+h_y(0)\hat{e}_y]e^{-i(kl-\omega t)}$
$e^{ik_{p0}l \sin(\Omega_{0m}t+\varphi)}$ n=2: $\vec{E}(r,l,t)=f(r)[h_x(0)e^{ik_{u0}l \sin(\Omega_{2m}t+\varphi_r)}\hat{e}_x+$
$h_y(0)e^{-ik_{u0}l \sin(\Omega_{2m}t+\varphi_r)}\hat{e}_y]e^{-i(kl-\omega t)}$ (26)

where we inserted the time dependence of the acoustic vibrations explicitly with arbitrary phases φ, and $\varphi_r$, defined $\kappa_{p0}$, and $\kappa_{u0}$ as the maximum amplitude of the acoustic vibrations, over a short distance of l such that the vibrations are coherent over this length scale, i.e., φ is a constant over this distance. Moreover, we ignored any additional phase in the time variation for simplicity. The time dependent term can be expanded using Bessel identity:

$e^{ik_{p0}l \sin(\Omega_{0m}t)}=\Sigma_\nu^\infty=-\infty J\nu(k_{p0}l)e^{ik_{p0}l\Omega_{0m}t}\approx 1+ik_{p0}l \sin(\Omega_{0m}t+\varphi)$ (27)

where we assumed a short distance where $\kappa_{p0}l \ll 1$. Note that an underlying assumption below this assumption is that within the distance l, the sinusoidal modulation caused by the acoustic mode $R_{0m}$ is coherent, meaning the For the moment for the sake of simplicity we will concentrate on the case for n=0, and inserting Eq.(27) into Eq.(26) we obtain $$\vec{E}(r,l,t) = (E_o + E_n) f(r) e^{-i(kl-\omega t)} \hat{e} \qquad (28)$$

where $E_o$ is the incident field amplitude, ê is the polarization direction, and $$E_n = E_0 i k_{p0} l \sin(\Omega_{0m} t + \varphi) \qquad (29)$$

is the noise field that is generated by the mode $R_{0m}$ with the acoustic modulation frequency $\Omega_{0m}$. From the noise field amplitude, we can calculate the time averaged noise power amplitude as $$P_n = P_0 \frac{(\kappa_{p0} l)^2}{2} \qquad (30)$$

where, $P_0 = |E_0|^2$ is the incident power. Note that this is true only under the assumption of $\kappa_{p0} l \ll 1$. This means that within this length l, the noise power spectrum grows with a squared dependence on l.

However, the acoustic modes would not remain coherent for the entire length of fibers when the fiber length is very long. Here we define the average coherence length of the acoustic modes as $l_c$. On average within this length, the GAWBS noise power would increase with a squared dependence, however, from one section of the fiber to the other separated by more than this length, the noise would not grow coherently. Considering Eq.(29), GABWS noise fields created in different sections would add up incoherently resulting in a linear growth in the GAWBS noise power. If we are determining what the level of GAWBS noise power would be at the end of a very long fiber span with a length $L_{sp}$ much longer than the GAWBS coherence length $l_c$ which is the usual case, we would obtain $$P_G(f_{0m}) = P_0 \frac{(\kappa_{p0} l_c)^2}{2} \frac{L_{sp}}{L_c} = P_0 \frac{\kappa_{p0}^2 l_c}{2} L_{sp} \qquad (31)$$

From Eq.(31) we can deduce the GAWBS scattering ratio per unit length (GSR) to be:

$$G_u = \frac{\kappa_{p0}^2 l_c}{2} \qquad (32)$$

Reducing the GAWBS of Optical Fiber

Looking at Eq.(32) we see that the GAWBS scattering ratio (GSR) is related to two quantities. First one is the $\kappa_{p0}$ which is related to physical parameters of the fiber such as glass density, and speed of sound etc., and also the overlap integral between the propagating optical mode and the acoustic modes. The other term is the coherence length $l_c$. Even though it might be difficult to change the physical parameters or some of the design parameters of the fiber to reduce the quantity $\kappa_{p0}$ without adversely affecting other important properties of fiber that are important to keep a high signal quality, it might be possible to reduce the coherence length $l_c$ of the GAWBS scattering. Reducing the impact of a degradation source through reducing its coherence length is not a new technique used for other sources of impairments, such as polarization-mode dispersion. A technique that was developed to reduce the impact of polarization-mode dispersion was spinning the fiber at a high rate during the drawing process so that the birefringence coherence length was reduced. We believe such a technique can also reduce the coherence length of the GAWBS scattering length and through Eq.(32) it would result in reducing the GRS.

Figure 4:
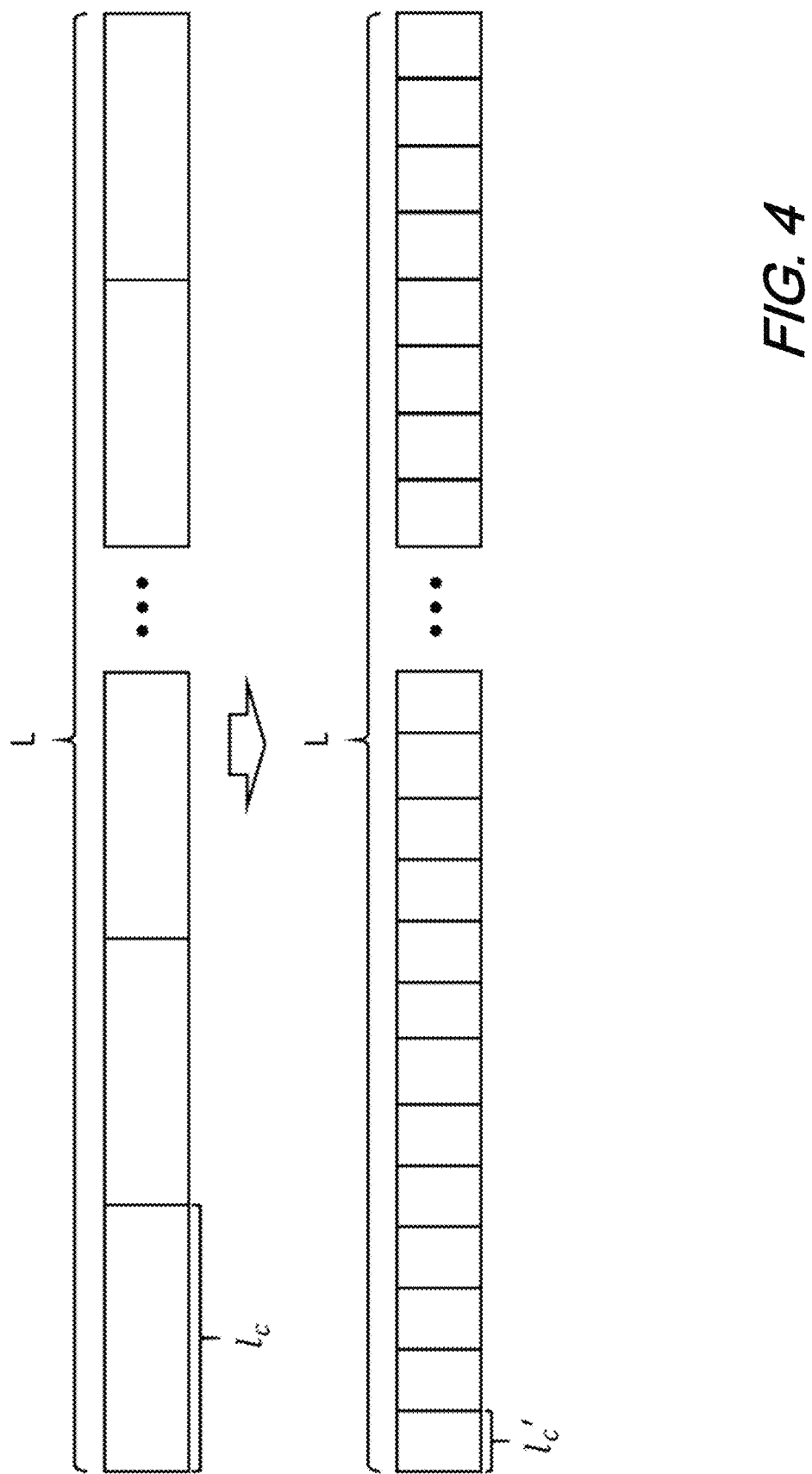
FIG. 4 is a schematic diagram outlining reduction of GAWBS noise according to aspects of the present disclosure.

FIG. 4 is a schematic diagram that outlines the reduction of GAWBS noise according to aspects of the present disclosure. From the figure, one can observe a fiber (upper fiber in diagram) having a total length L. The fiber has a coherence length of $l_c \ll L$, which is long. Also shown in the figure is another fiber (lower fiber in diagram) is a low GAWBS design that exhibits the same length as the upper fiber, however the coherence length of GAWBS is reduced to $l'_c < l_c$, which should reduce the overall GAWBS noise at the end of the fiber by a factor of $l'_c / l_c$.

Advantageously, by reducing the coherence length of the GAWBS noise while retaining other fiber parameters, the GAWBS noise can be reduced while maintaining other fiber parameters that affect the signal quality.

As noted, a technique that was developed to reduce the impact of polarization-mode dispersion involved spinning the fiber at a high rate during the drawing process so that birefringence coherence length was reduced. According to aspects of the present disclosure, such a technique can also advantageously reduce the coherence length of the GAWBS scattering length and through Eq.(32) it would result in reducing the GRS.

Figure 5:
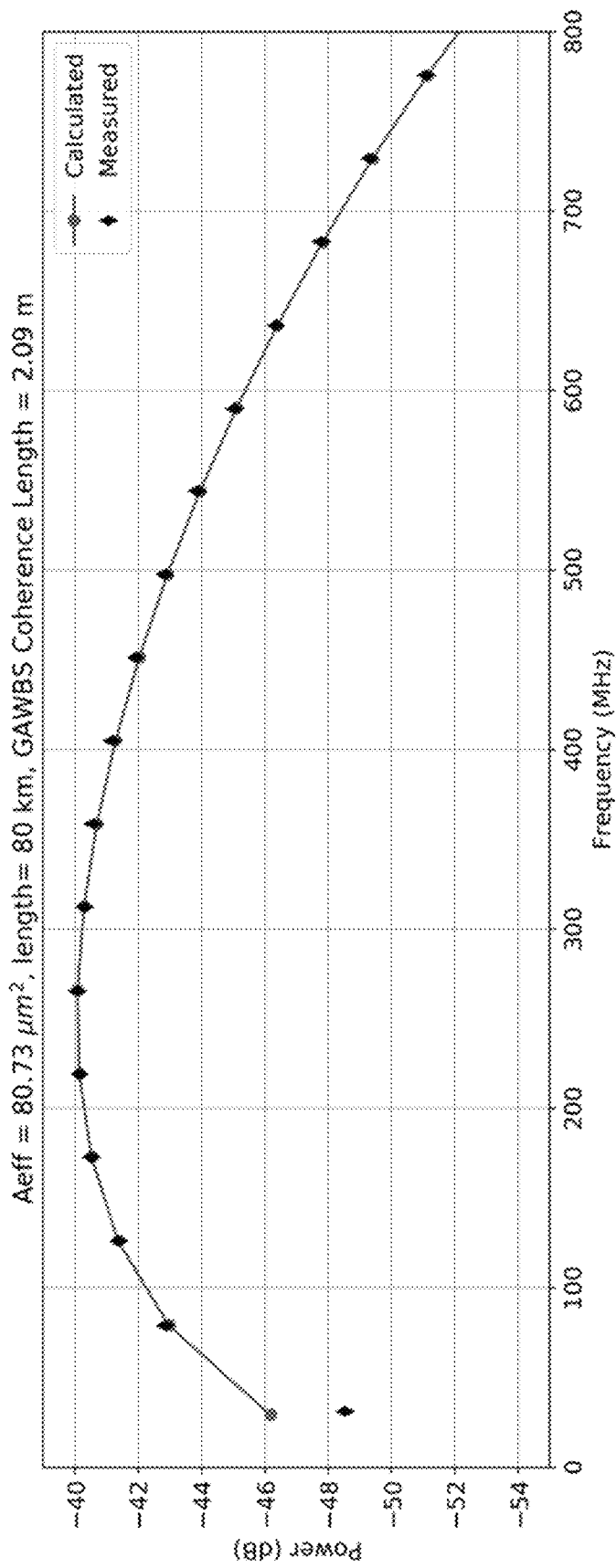
FIG. 5 is a plot illustrating a comparison of measured GAWBS noise spectrum vs calculated values for 80 km fiber according to aspects of the present disclosure.

FIG. 5 is a plot illustrating the comparison of measured GAWBS noise spectrum vs the calculated values. The fiber under test was 80 km long, with an effective area of 80.73 µm$^2$. For this fiber we determined the best fitting coherence length to be $l_c$=2.09 m. We used the following parameters to calculate the GAWBS noise as outlined above: wavelength=1550 nm, $p_{11}$=0.113, $p_{12}$=0.27, $V_d$=5838.8 m/s, glass density=2.2 g/cm$^3$, refractive index=1.47, fiber cladding diameter=125 µm, core diameter=7.97 µm, cutoff wavelength=1230 nm, temperature=300 K. Using these parameters, the only free parameter left to be able to fit the calculations to the measurement is the coherence length as shown in Eq.(32). As noted above, for this fiber, the best fitting value for $l_c$=2.09 m.

Figure 6:
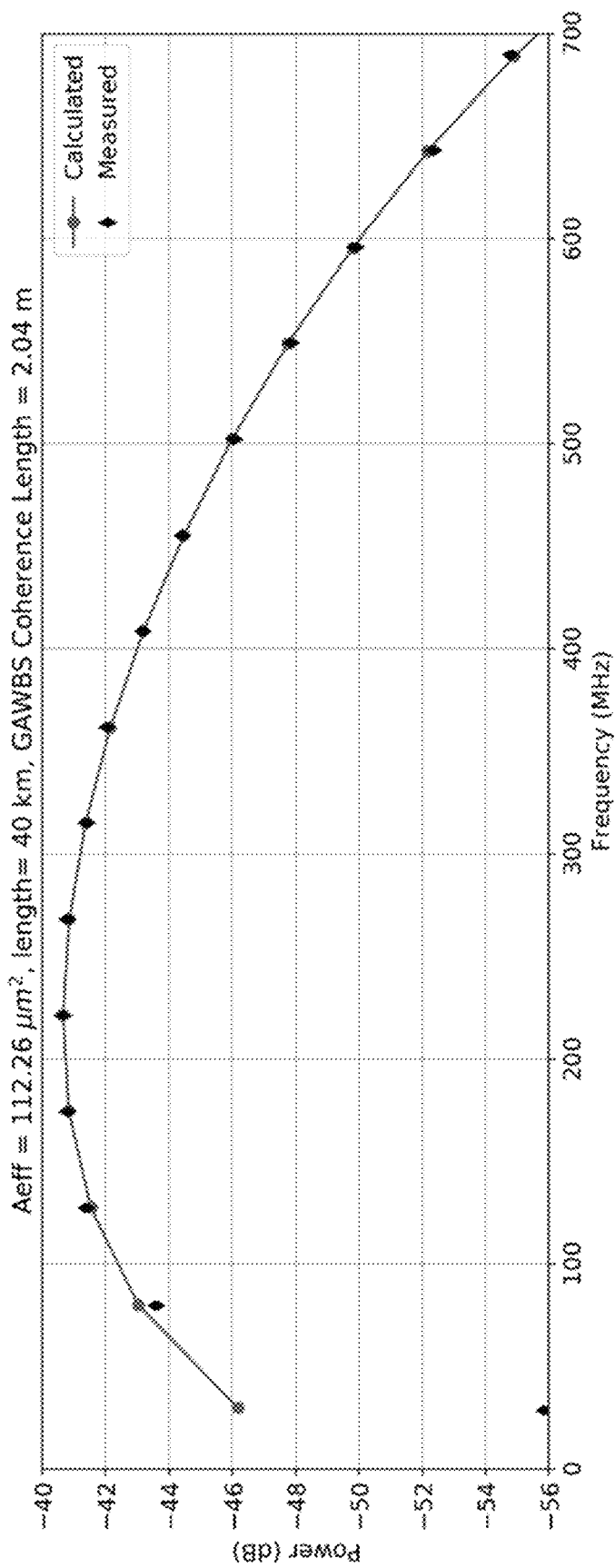
FIG. 6 is a plot illustrating a comparison of measured GAWBS noise spectrum vs calculated values for 40 km fiber according to aspects of the present disclosure.

FIG. 6 is a plot illustrating a comparison of measured GAWBS noise spectrum vs the calculated values. The fiber under test was 40 km long, with an effective area of 112.26 µm$^2$. For this fiber we found the best fitting coherence length to be $l_c$=2.04 m.

Figure 7:
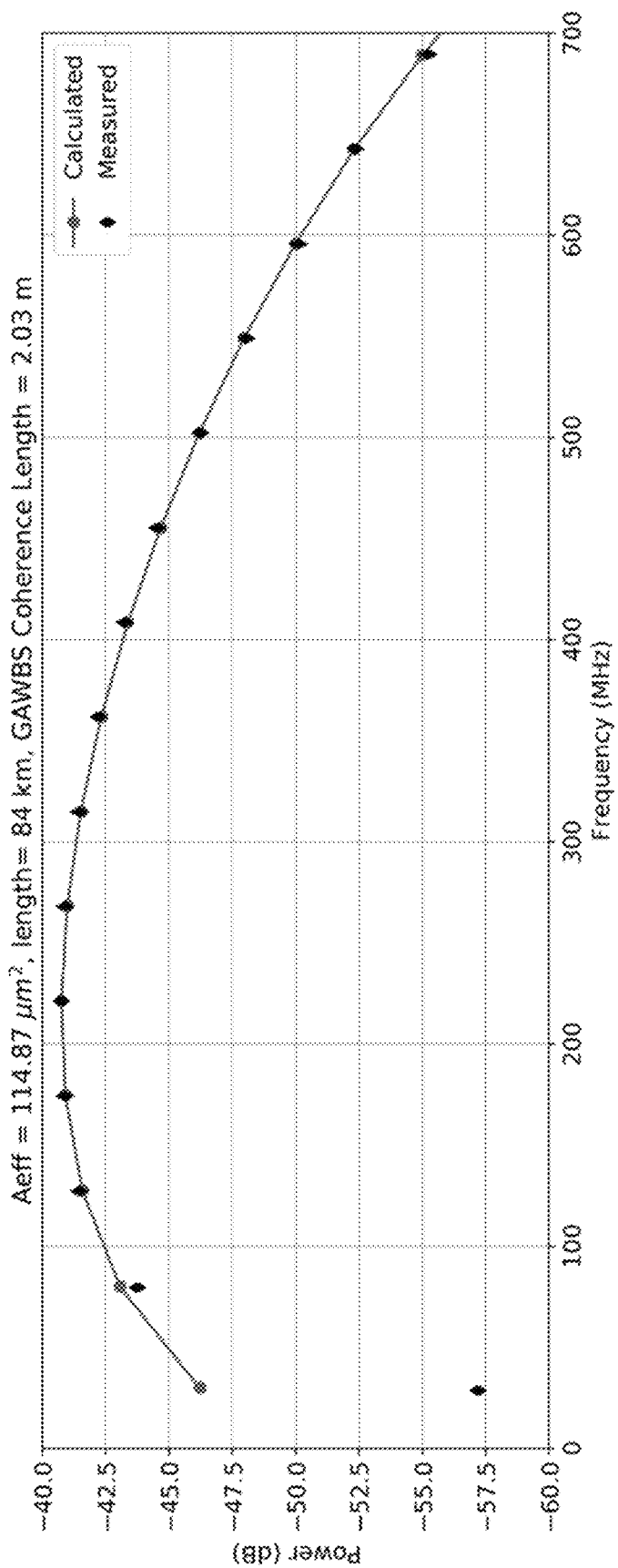
FIG. 7 is a plot illustrating a comparison of measured GAWBS noise spectrum vs calculated values for 84 km fiber according to aspects of the present disclosure.

FIG. 7 is a plot illustrating a comparison of measured GAWBS noise spectrum vs the calculated values. The fiber under test was 84 km long, with an effective area of 114.87 µm$^2$. For this fiber we found the best fitting coherence length to be $l_c$=2.03 m.

Figure 8:
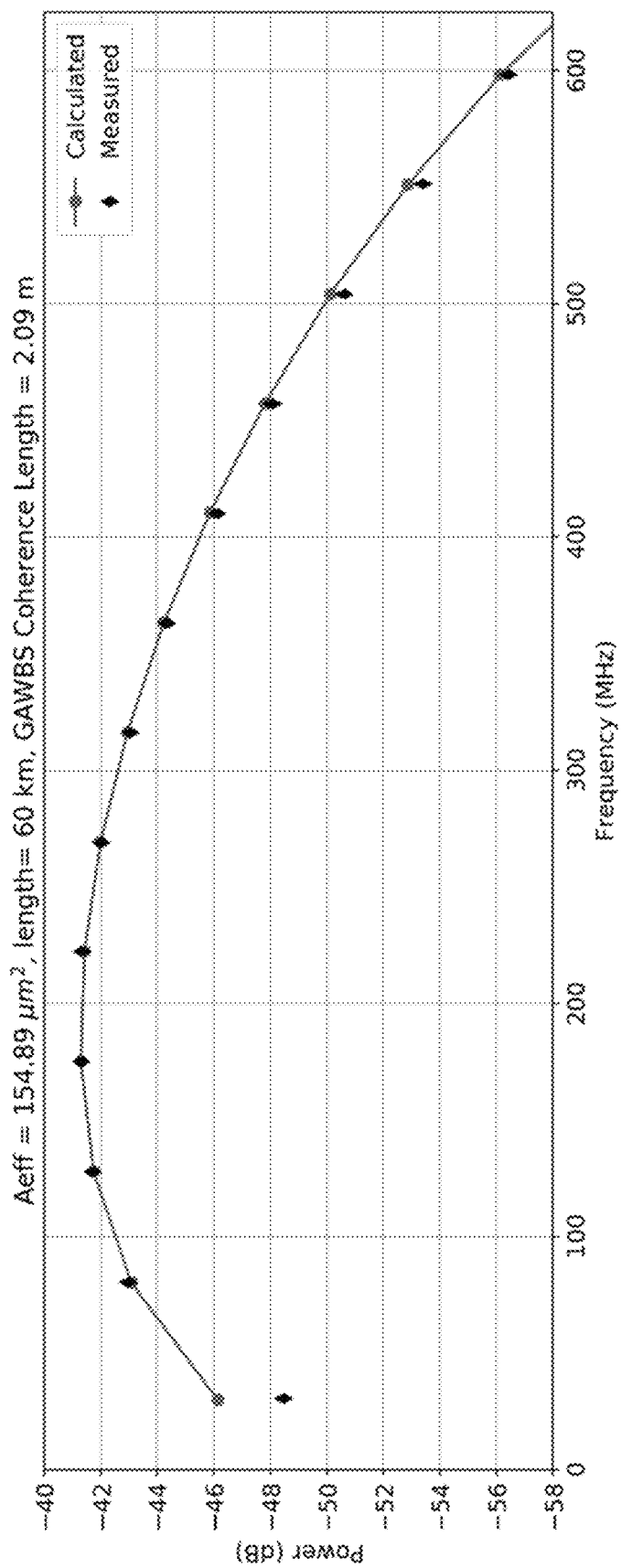
FIG. 8 is a plot illustrating a comparison of measured GAWBS noise spectrum vs calculated values for 60 km fiber according to aspects of the present disclosure.

FIG. 8 is a plot illustrating a comparison of measured GAWBS noise spectrum vs the calculated values. The fiber under test was 60 km long, with an effective area of 154.89 µm$^2$. For this fiber we found the best fitting coherence length to be $l_c$=2.09 m.

We found out that the coherence length is quite consistent across different fibers typically used for submarine optical communications to be around 2 m. Even though such a length scale is on the shorter side, it is still possible to reduce this coherence length through spinning.

We now turn our attention to the measurement of GAWBS in optical fiber. Since GAWBS is so small when measured using short samples of fiber, it becomes a challenge to design a measurement technique that is simple to set up and accurate enough for our purposed.

According to aspects of the present disclosure, it is possible to measure GAWBS for short fibers, as short as only a few kilometers. This has an advantage because it is not needed to procure or produce long lengths of fiber to test GAWBS noise. This makes it cost effective. It also makes measurements fast, simple, and accurate.

Prior Art for Measuring GAWBS:

Generally, there are two prior-art approaches to measuring GAWBS. The first approach emulates a very long transmission distance, and therefore accumulates sufficient GAWBS noise to a level that is easily measurable. In this approach a so-called recirculating loop is set up which generally consists of several fiber spans under test with repeaters between spans. The total distance in the recirculating loop may be several hundred kilometers. In order to emulate a transmission with much longer distances the signal at the end of the loop is looped (fed) back to the input of the loop, and recirculating the signal in the same loop many times until the signal it recovered at the desired distance to be emulated. Unfortunately, there are several drawbacks to such an approach. First, it is very complicated. Setting up such a loop requires careful adjustment of amplifiers, amplifier gain to the span loss, managing the accumulation of the imperfections of the amplifier gain shape etc. Second, it typically requires multiple spans to set up a loop as using a single or only a few spans results in a loop too unstable for emulating long distances. Using multiple spans for measurements, makes the measurement set up more costly as it requires the use of multiple spans instead of only a few or less. Third, transmitting over long distances accumulates not only GAWBS noise, but it also accumulates other impairments from the fiber. For instance, amplified-spontaneous emission (ASE) noise added by amplifiers after each span, and nonlinear noise generated by nonlinear interaction of signals along the link are also added to the signal(s). Both ASE and nonlinear noise increase linearly with transmission length, and therefore, even if the GAWBS noise keeps increasing with longer distance, its ratio to other noise sources remains the same after an initial span. Therefore, after long distance emulator, the noise source(s) must be carefully analyzed and separated to isolate GAWBS noise.

Figure 9:
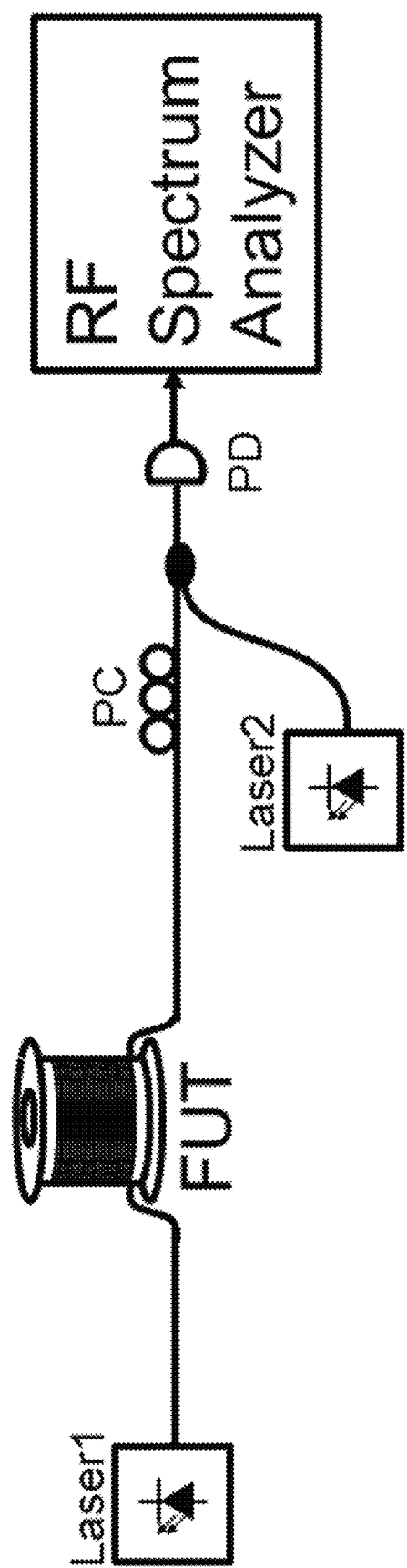
FIG. 9 is a schematic diagram of an illustrative heterodyne measurement arrangement using an RF spectrum analyzer.

Another approach to measuring GAWBS noise involves using shorter lengths of fibers, a single or just a few cascaded spans. This approach relies on using sensitive equipment to measure the GAWBS noise level. An example is using radio frequency (RF) spectrum analyzer, which is schematically shown in FIG. 9 which is a schematic diagram showing an illustrative, simplified example of a heterodyne measurement method using an RF Spectrum analyzer as known in the art.

With reference to that figure, light emitted from a narrow linewidth laser is launched into a fiber under test (FUT). Light output from the fiber is directed to a photodiode after combining with light emitted from a second, narrow linewidth laser.

Subsequent to the FUT, amplifiers and filters may be employed to condition the signal output from the FUT. Those skilled in the art will understand and appreciate that one critical requirement is that the polarization characteristic of both lasers should be aligned at the photodiode (PD) as it detects a beating between the output(s) of the two lasers. Typically, a polarization controller (PC) is used to for this alignment. Such a set up makes measurements much simpler compared to the previous approach as it requires only a single span of fiber. However, there are still several disadvantages. First, the polarization state of the laser 1 needs to be actively controlled, either manually, which makes it unwieldy, or automatically using some sort of instrumentation, which makes it more expensive, and complicated. Second, GAWBS noise is generated in all polarizations, and this set up can only measure the GAWBS noise in the polarization that it aligned with the polarization of the local oscillator (in FIG. 9 this duty is given to laser 2. To measure GAWBS in both polarization the PC needs to be adjusted carefully to measure total GAWBS in two separate measurements. Third, even narrow linewidth lasers have laser phase noise that is large enough that will affect the measurement of the GAWBS. Using two separate lasers means doubling of such noise level, which will reduce the sensitivity of the measurement. Fourth, having two separate lasers results in their frequencies not being locked. That means, frequency and phase drift between the two lasers need to be digitally estimated and removed, which adds one more possible route for affecting the measurement sensitivity.

As we shall show and describe systems, methods, and structures according to aspects of the present disclosure employ a homodyne receiver which simplifies the processing of measurement. It also avoids the limitation of dynamic range by suppressing the large carrier. At the same time, systems, methods, and structures according to aspects of the present disclosure advantageously achieve an accurate estimation of noise level as compared to the carrier by placing a secondary laser. In this way, we can get accurate measurement of GAWBS noise even over short lengths of fiber, at the same time, we can measure both polarization components of GAWBS noise simultaneously.

As we shall show and describe our inventive systems methods and structures advantageously 1) suppress the large carrier by using band-pass filters, which improve the dynamic range of the measurement; and 2) uses a secondary laser that allows for accurate calibration of noise level compared to the carrier, without sacrificing dynamic range. Of further advantage, systems, methods and structures according to aspects of the present disclosure may simultaneously measure both polarization components of GAWBS—which those skilled in the art will understand and appreciate is an important "sanity check" on the measurement.

Figure 10:
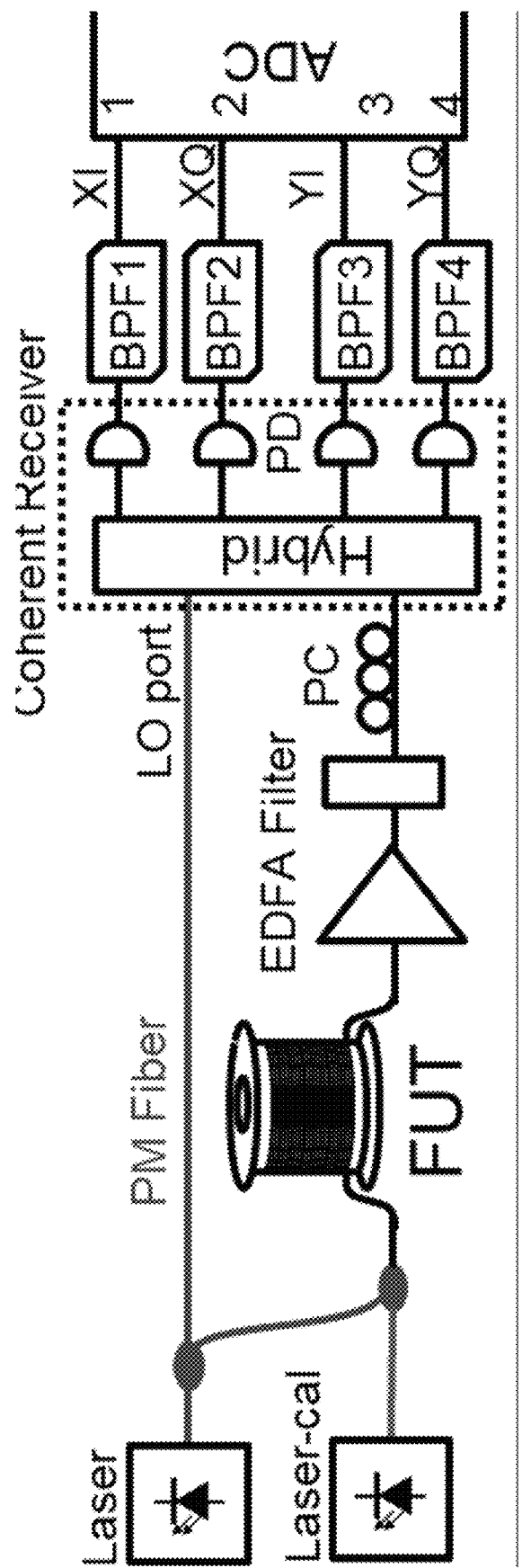
FIG. 10 is a schematic diagram of an illustrative homoodyne measurement arrangement according to aspects of the present disclosure.

FIG. 10 is a schematic diagram of an illustrative homodyne GAWBS measurement arrangement according to aspects of the present disclosure. With reference to that figure, it may be observed that in our inventive arrangement according to the present disclosure, light emitted from a continuous-wave (CW) laser is split into two parts. One part serves as local oscillator, and the other part is combined with light emitted from second laser (calibrating laser) Laser-cal for reasons that will be clear later, and the combined light is launched into the FUT.

After traversing the FUT, the light may be amplified through the effect of amplifiers which increase signal power subsequently filtered by—for example—optical band-pass filters which limit ASE noise. Even though a PC is included in the signal path in FIG. 10, it is not necessary.

The filtered signal is then directed to a signal port of a coherent receiver as shown in the figure in a dashed box. As is known, a coherent receiver is a ubiquitous device in the optical communications field. Operationally, a hybrid within the coherent receiver receives as input the LO and the optical signal. It creates 4 separate paths each of which overlaps the signal and the LO in two orthogonal polarizations—denoted as X and Y. Each polarizations overlaps in two quadratures known in the art as in-phase and 90-degrees out of phase which are typically denoted as I and Q. The beating in the 4 quadratures are detected by 4 balanced photodiodes. The beating signals are passed through RF band-pass filters and—after filtering—the 4 beating signals are sampled by an ADC. Note that all the phase, amplitude and polarization information regarding the signal with respect to the LO is contained in these 4 beating signals.

We can now further explain certain particular advantages of our inventive arrangement and application. First, since we use a coherent receiver, we retain all the information in all the polarizations at all times. As a result, we can measure GAWBS noise in both polarizations simultaneously and need not need manage polarization state of the laser. Additionally, any drift of signal polarization can be traced and removed using signal processing. Note that polarization drifts much slower than phase which is much more accurate compared to phase tracking required for the heterodyne method shown in FIG. 9.

The bandpass filters (BPFs) positioned after the coherent receivers improve the sensitivity of our measurement set up. They allow for shifting the dynamic range of the measurement to the range having the GAWBS noise, and it also removes noise from ASE-ASE beating. We note that GAWBS noise extends to about 1 GHz away from the CW laser, which we may refer to as the carrier.

The optical BPF's shown positioned after the erbium-doped fiber amplifiers (EDFAs) filters out the ASE noise, however, in practice it is difficult to find ASE filters with band-pass bandwidths as narrow as 2 GHz. Typically, such filters tend to be as wide as 50 GHz. An alternative is to digitally filter the out of band noise if the ADC has large enough bandwidth however, sampling noise at such an unnecessarily high bandwidth introduces an unnecessary noise floor. Our solution to this problem is to use an RF filter that cuts out signal above 1 GHz after the photodiodes, but before sampling. In this manner the out-of-band ASE is prevented to fold back into the 1 GHz after sampling, and also excess noise from ASE-ASE beating noise from the higher frequency noise is eliminated. As will be appreciated, one advantage of using BPFs is that it allows for using practical and low cost optical BPFs, while also allowing for using a low sampling rate ADC, at the same time prevent deterioration from out-of-band ASE noise. Note that for some special fibers the GAWBS noise can extend further or less than 1 GHz. The BPFs higher rejection edge can be reduced or increased as required according to the FUT.

Figure 11:
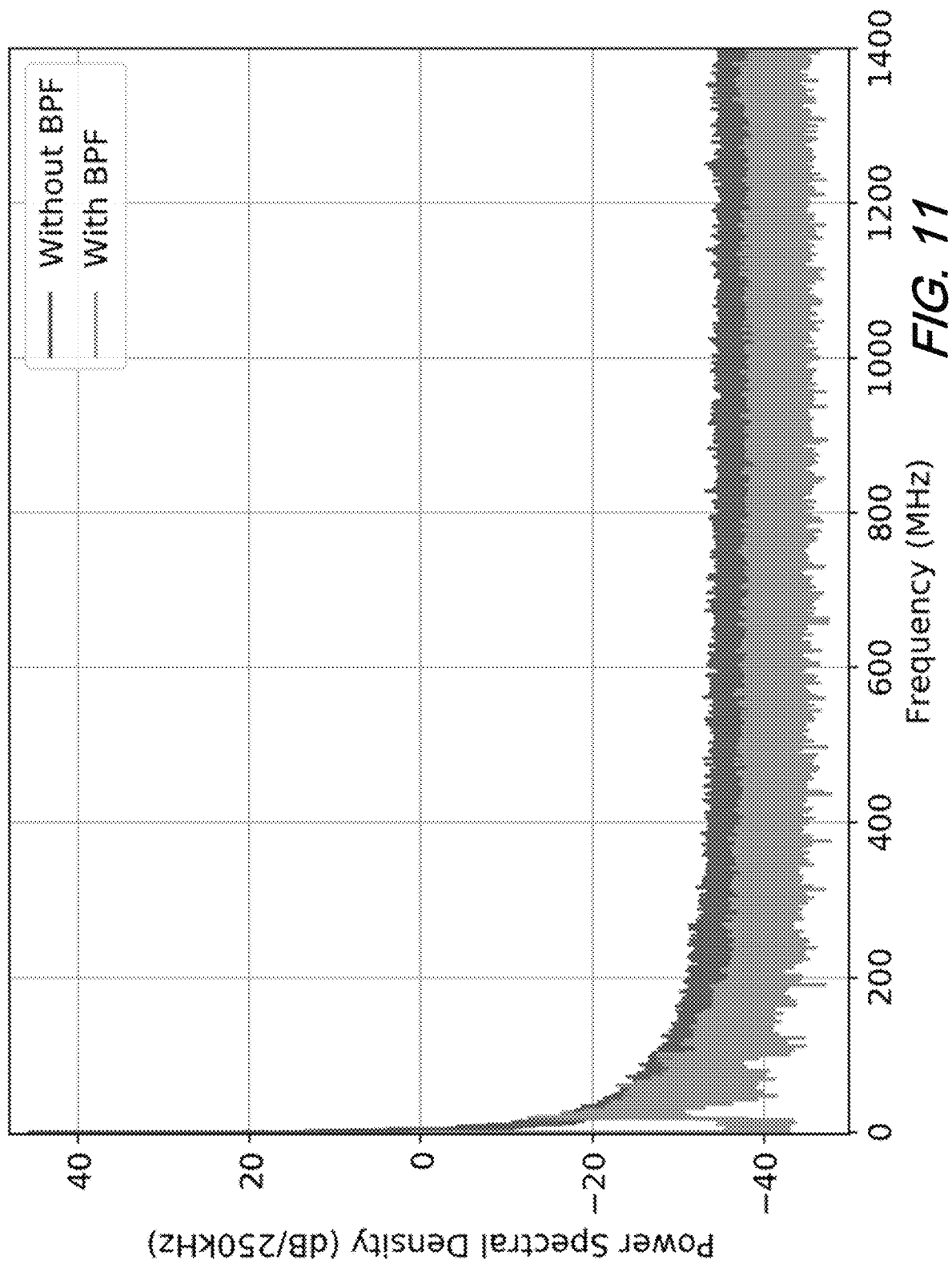
FIG. 11 is a plot showing a comparison of a back-to-back measurement showing impact of BPF according to aspects of the present disclosure.

FIG. 11 is a plot showing a comparison of a back-to-back measurement showing impact of BPF according to aspects of the present disclosure. With this figure in view, we note that there is another advantage of using BPFs, which is rejecting power close to DC. As an example, rejecting noise from DC to 15-20 MHz. GAWBS noise exhibits itself as multiples peaks of noise. The peak with the lowest frequency for typical fibers with cladding diameters around 125 micrometers is >20 MHz. For fibers with significantly different parameters a more suitable threshold can be chosen.

One purpose of rejecting the DC can be explained as follows. As noted, the ratio of the GAWBS noise peaks to the carrier level is typically larger than 60 dB. This means the measurement noise floor should be close to 80 dB below the carrier level to have sufficient precision. This is difficult to achieve and is—in effect—a limitation of the dynamic range. As a solution, the DC portion can be rejected which contains the carrier power. FIG. 11 shows an example of a measurement, where the FUT is removed and also shows the carrier and the noise floor in the back-to-back configuration. Without the BPF, there is a large DC contribution which comes from the DC with higher noise floor. Suppressing the DC with a BPF shows that the noise floor is reduced but the DC carrier can no longer be measured within the same measurement.

We note however, that removing the carrier leaves us with another problem. In particular, the GAWBS noise power is only meaningful relative to the carrier. With the carrier removed from the measurement, how can we relate the measured GAWBS noise level to the carrier level? Even though one can calibrate this in separate measurements, it is better to have a self-calibrating scheme, where instabilities or drifts between separate measurements which can inject further uncertainties into the measurements can be avoided. For this situation, we use what we called the calibrating laser—Laser-cal. Laser-cal is another narrow-band laser wherein its output light is combined with the light of the original laser before entering the FUT. The power level of the Laser-cal is adjusted to be about 30 dB below the Laser. Its polarization in general can be totally arbitrary as compared to the Laser, however to simplify the digital processing, it can be aligned to the Laser. This can simply be obtained by using PM components for combining the two lasers. Operationally, the frequency of Laser-cal is shifted with respect to the laser in such a way that it is outside of the bandwidth where the GAWBS tones are measured, but just inside the pass-band of the BPFs. FIG. 12 is a schematic diagram showing illustrative measurement settings according to aspects of the present disclosure and shows how the signal will look like in spectral domain.

With continued reference to that figure, we note that we define the GAWBS window as shown in FIG. 12 as the window that contains all the GAWBS tones desired to be measured. For transmission systems what matters is the total GAWBS noise power experienced by the signal. The GAWBS tones typically have a maximum around 100-300 MHz, and beyond that the power of the tones decrease away from the carrier. We define the last GAWBS tone as the tone after which the contribution of additional tones is negligible. Therefore, the first and the last GAWBS tones determine the GAWBS window. The frequency of the Laser-cal is chosen so that it is beyond the last GAWBS tone, but still inside the band-pass window of the BPFs. Since the power of the Laser-cal is 30 dB lower than the carrier, the Laser-cal and GAWBS can be simultaneously measured without requiring such a large dynamic range as before. The power level of the GAWBS tones can be compared to the Laser-cal which can be used to as a calibration point to relate the GAWBS power to the carrier power. Note that, similar t the case of heterodyne approach, Laser-cal is not locked to the carrier. That means its frequency and phase will drift compared to the carrier within the measurement time window. However, in our case all we need is the total power of the Laser-cal, and we are not interested in its instantaneous frequency. Therefore, we can keep the measurement window almost arbitrarily long to improve sensitivity as needed, as long as the frequency drift is not too large that it would overlap with the GAWBS window. Such is the case for most commonly used lasers for communications.

To reiterate, with our inventive arrangement according to the present disclosure, the measurement set up is no longer limited by the dynamic range of the measuring equipment, while we can directly calibrate the GAWBS power to the carrier. We can measure both polarizations of the GAWBS noise simultaneously. We also can limit the impact of the ASE noise by narrow-band filtering achieved by coherent detection and the RF BPFs.

We note however, as it is there is one more aspect of our solution and our heterodyne approach as compared to the first approach that emulated long distance transmission. Typical narrow-band lasers used for optical communications have low linewidth and phase noise, however, it is still large enough that the residual laser phase noise extends into the GAWBS window and buries tones partially, especially close to the carrier. This can be seen in FIG. 12, where the laser phase noise extends to 300 MHz. In the case of the first approach of the prior art, GAWBS is allowed accumulate long enough to dominate over the residual laser phase noise. Again, however, the prior art has to deal with other noise sources such as ASE and nonlinearity that also grows with distance to deal with, that our solution doesn't have to.

Nevertheless, it is not that difficult to deal with the residual laser linewidth as it can be accurately measured and removed from the measured signal. Lase noise can be measured in back-to-back condition by removing the FUT. The lase phase noise would remain unchanged after the FUT. However, in the case of nonlinear noise accumulated after a long transmission distance, or an emulator of a long transmission distance, the nonlinear noise depends on many parameters of the measurement set up such as fiber dispersion, loss, neighboring signals if there are any, etc.

Figure 13A:
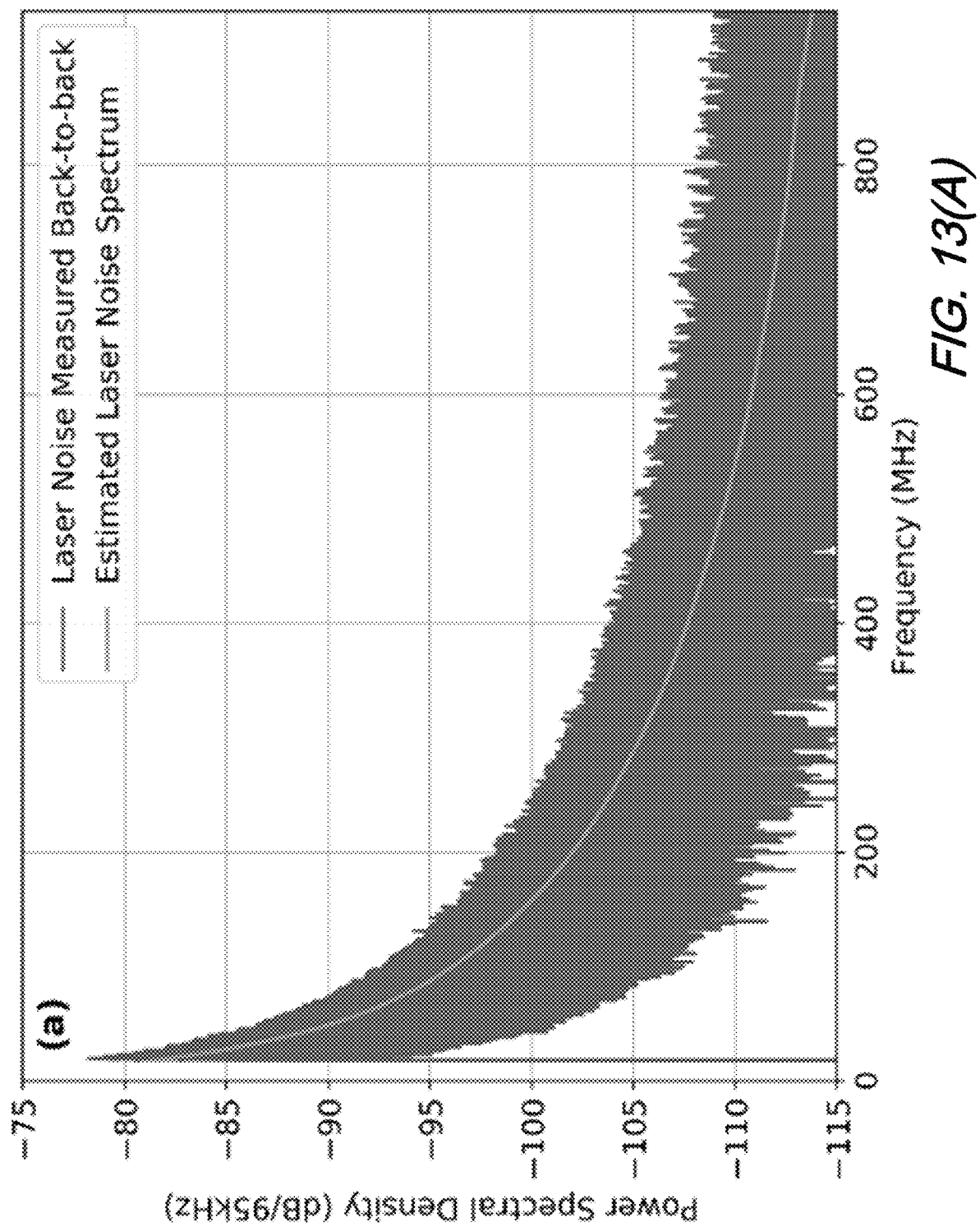
FIG. 13(A) is a plot showing a spectrum of laser phase noise measured in a back-to-back configuration and the estimated noise according to aspects of the present disclosure.
Figure 13B:
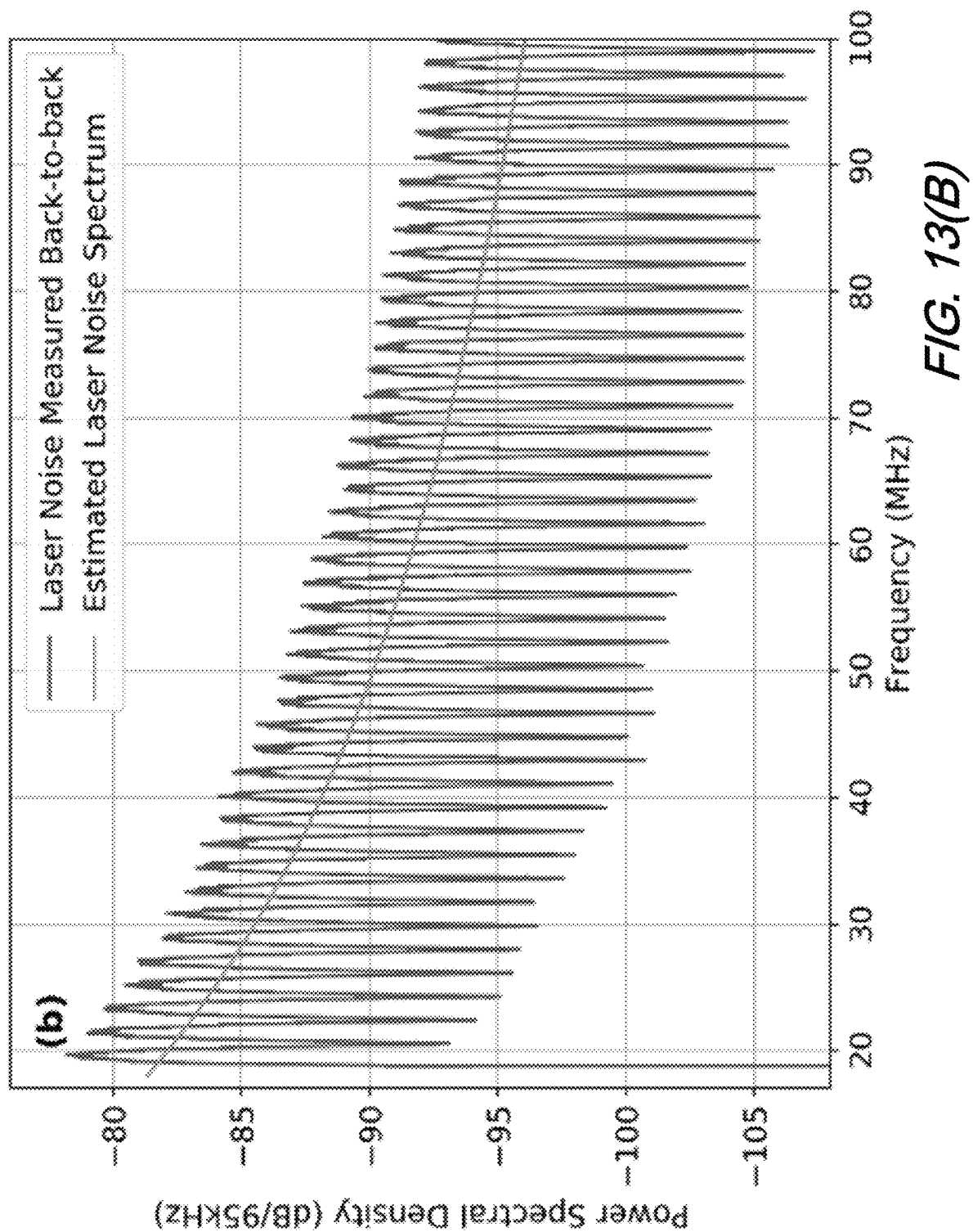
FIG. 13(B) is a close-up of the plot of FIG. 13(A) according to aspects of the present disclosure.

FIG. 13(A) and FIG. 13(B) are plots showing a spectrum of laser phase noise as measured in a back-to-back configuration and the estimated noise in which FIG. 13(B) is a close-up of the plot of FIG. 13(A), according to aspects of the present disclosure. With simultaneous reference to these figures, it may be observed that the spectrum of the laser in the back-to-back configuration, i.e., the FUT is removed. Since this is a homodyne measurement—meaning the signal and the LO is from the same source—the delay between the signal and LO arm exhibits as a sinusoidal filtering of the residual laser noise. This filtering can be clearly seen in the close-up of the figure. From this measurement we estimate the laser phase noise spectrum and after inserting the FUT, we can subtract the laser phase noise to isolate the GAWBS noise.

Figure 14A:
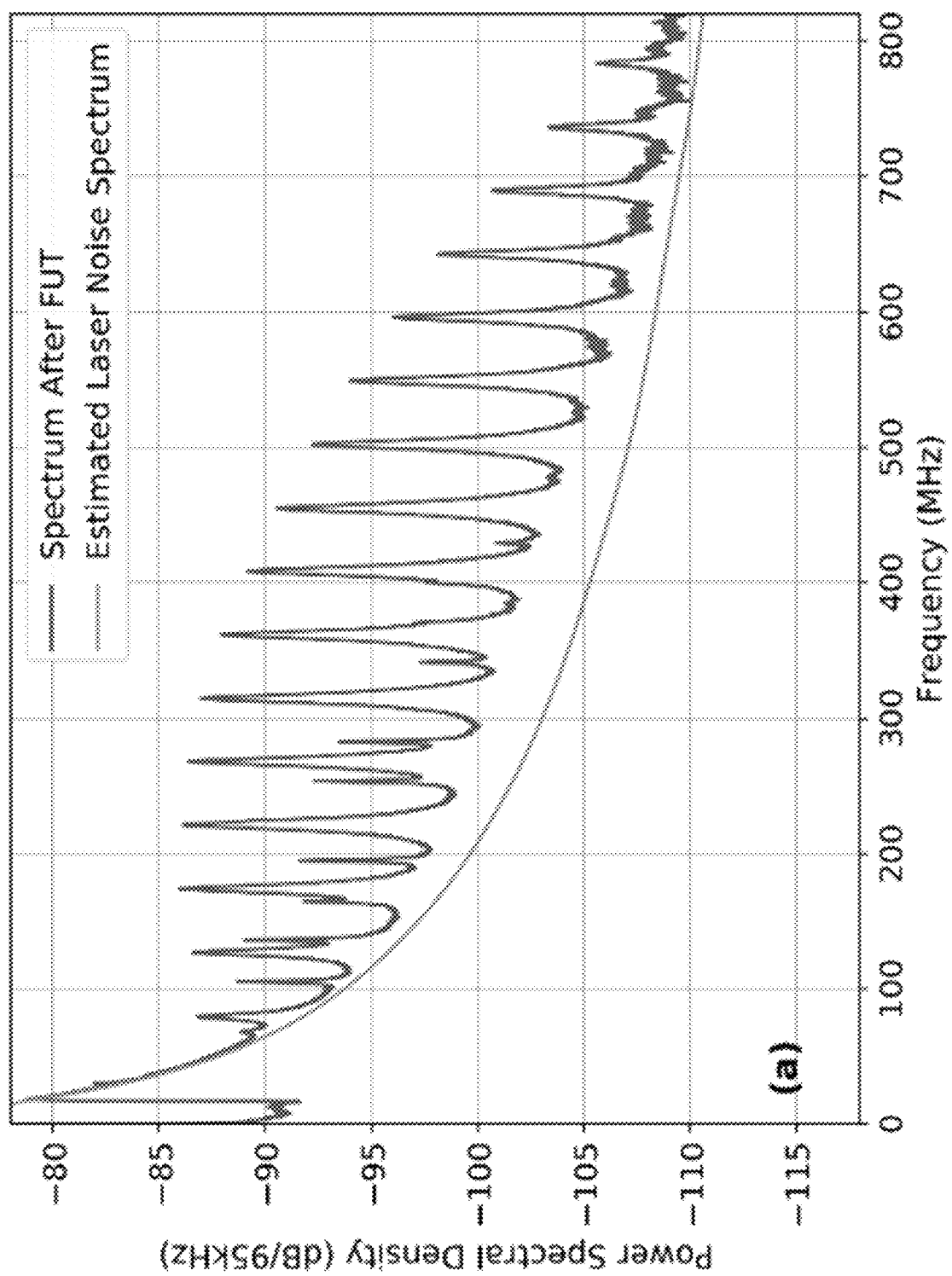
FIG. 14(A) is a plot showing a spectrum measured after FUT compared with laser phase noise estimated in the back-to-back configuration according to aspects of the present disclosure.
Figure 14B:
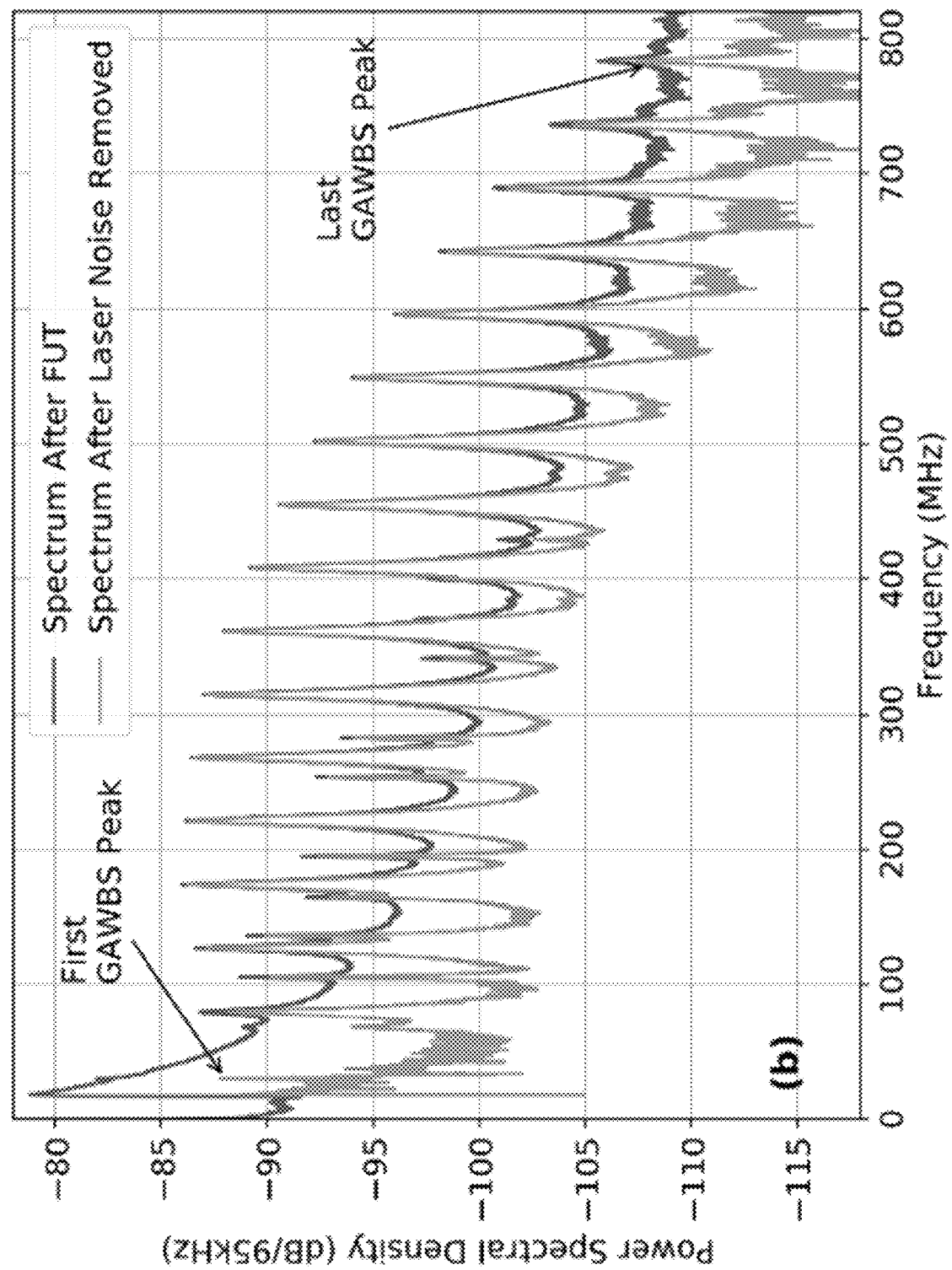
FIG. 14(B) is a plot showing the spectrum after the FUT compared with that after removing the laser phase noise according to aspects of the present disclosure.

FIG. 14(A) and FIG. 14(B) are plots showing a spectrum of laser phase noise as measured in a back-to-back configuration and the estimated noise in which FIG. 14(B) is a plot showing the spectrum after the FUT compared with that after removing the laser phase noise, according to aspects of the present disclosure.

As may be observed from these figures, after the FUT, the signal is received with the ADC. After sampling the signal, power spectral density (PSD) can be calculated. If the received power is comparable to the equipment noise floor, the noise floor can also be measured and removed from the PSD. In addition, measurement set up has a frequency dependent response, that response can also be measured and removed.

As noted, FIG. 14(A) shows the PSD after the PSD obtained after 48-km-long single mode fiber. In this example, the ADC noise floor was also measured without signal, and subtracted from the signal PSD. Furthermore, this example is for the signal with the polarization that is aligned with that of the carrier. Since GAWBS creates a symmetric spectrum around DC, only the positive spectrum is shown. It can be clearly seen that laser phase noise has a large contribution to the PSD especially for lower frequencies. For accurate estimation of GAWBS noise, this contribution should be accurately estimated and removed.

Figure 15:
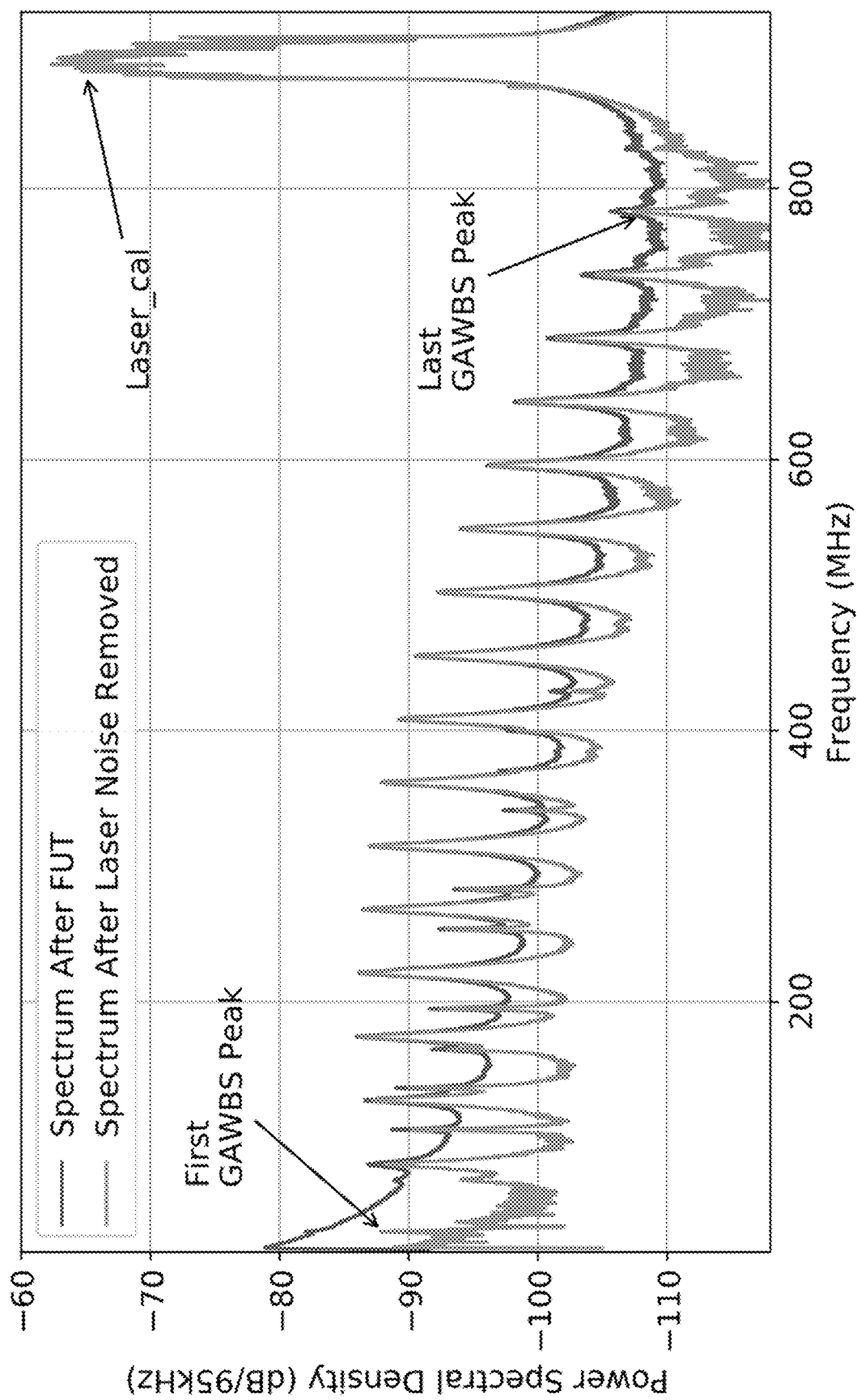
FIG. 15 is a plot of FIG. 14(B) with x-axis extended to show laser-cal at edge of the GAWBS window according to aspects of the present disclosure.

FIG. 14(B) shows the PSD after the laser phase noise is removed. As an example, here the criterion for choosing the GAWBS window is such that it includes all the GAWBS peaks that are higher than 20 dB below the highest GAWBS peak FIG. 15 is a plot of FIG. 14(B) with x-axis extended to show laser-cal at edge of the GAWBS window according to aspects of the present disclosure. Such GAWBS window used for calibrating the level of the GAWBS to the level of the carrier. With reference to FIG. 15, we note that it shows the measurement result after FUT, however, here the Laser-cal is also shown. In this example, the power level of the Laser-cal was 29 dB lower than power level of the carrier. It is located nominally 900 MHz away from the carrier, which is just outside of the GAWBS bandwidth and inside the pass-band of the BPF. The Laser-cal is a narrow linewidth laser similar to the carrier, however it appears broadened as it is not frequency/phase locked to the carrier. Within the measurement time, Laser-cal's phase and frequency drift with respect to the carrier. However, since we are only interested in its power, we just integrate the total power under the Laser-cal. Therefore we do not need any signal processing to remove frequency variations of either the carrier or the Laser-cal. Note that, in FIG. 15, only the polarization components parallel to the carrier is shown. In general the Laser-cal may not be parallel to the carrier. In that case, one needs to add all the power of the Laser-cal in both polarization components.

We note that typically the laser phase noise is polarized parallel to the carrier. Therefore, no residual phase noise is expected to distort the measurement of the GAWBS noise polarized orthogonal to the carrier. PSD in the orthogonal polarization to the carrier is shown FIG. 8 after the ADC noise floor is removed. As it can be seen orthogonal polarization is not affected by the laser phase noise. However, in case there is orthogonally polarized noise, or the carrier polarization is not accurately retrieved, the leakage from the parallel polarized phase noise to the orthogonal polarization can still be estimated and removed similarly. In this example, the GAWBS windows is chose to include all the GAWBS peaks within 25 dB of the largest GAWBS peak.

It should be noted by looking at FIG. 10, which shows the measurement set up that our measurement also includes contribution from ASE. However, if the span length is not too long <80 km, the contribution of ASE would be below the instrument noise floor and can be neglected. Since the span length is longer, the noise floor from ASE which is expected to be flat can also be estimated and removed. This is much simpler and reliable compared to estimating and removing ASE floor after many spans, or emulating many spans as it is done in the prior art. Since in the case of prior art, many EDFAs are used, and each EDFA needs gain flattening filters. Cascading over many EDFAs and gain flattening filters may leave the ASE floor not flat, which may be difficult to estimate accurately.

We note that the examples shown in FIG. 14(A), FIG. 14(B), FIG. 15, and FIG. 16 are measurements from 48-km-long fibers, however it is clear from the high signal-to-noise ratio shown in the figures that with this invention, GAWBS can be measured reliably for fibers as short as just a few kilometers. Being able to measure GAWBS for such short sections of fiber allows for estimating GAWBS from short samples of prototypes which reduces the cost of new fiber and cable development.

For optical communication systems, what matters is the total power generated by GAWBS in the GAWBS windows. To find out how much system degradation is caused by GAWBS, it is necessary to integrate all the noise power within the GAWBS window in both polarizations. Therefore it is important to measure both polarization components, however, in practice it is not necessary to be able to separate them. Neither is it important to be able to separate in polarization components that are parallel, and orthogonal to the carrier. However, there is one benefit to being able to separate GAWBS noise that is parallel to the carrier and orthogonal to the carrier. GAWBS noise created by acoustic modes in the fiber. There are two sets of acoustic modes that dominates the generation of GAWBS. One set known as R0m modes only creates GAWBS noise that is parallel in polarization to the carrier, and this contribution is known as the polarized contribution. The other set known as Tr2m generates GAWBS noise that is both parallel and orthogonal to the carrier, and this contribution is known as the unpolarized contribution. However, the Tr2m contributes twice as much to the orthogonal polarization as the polarized contribution. Therefore, we can use this relation as a sanity check on our measurements if we can separate the GAWBS noise into two contributions that are parallel and orthogonal to the carrier, which our invention can do in a single shot.

Figure 16:
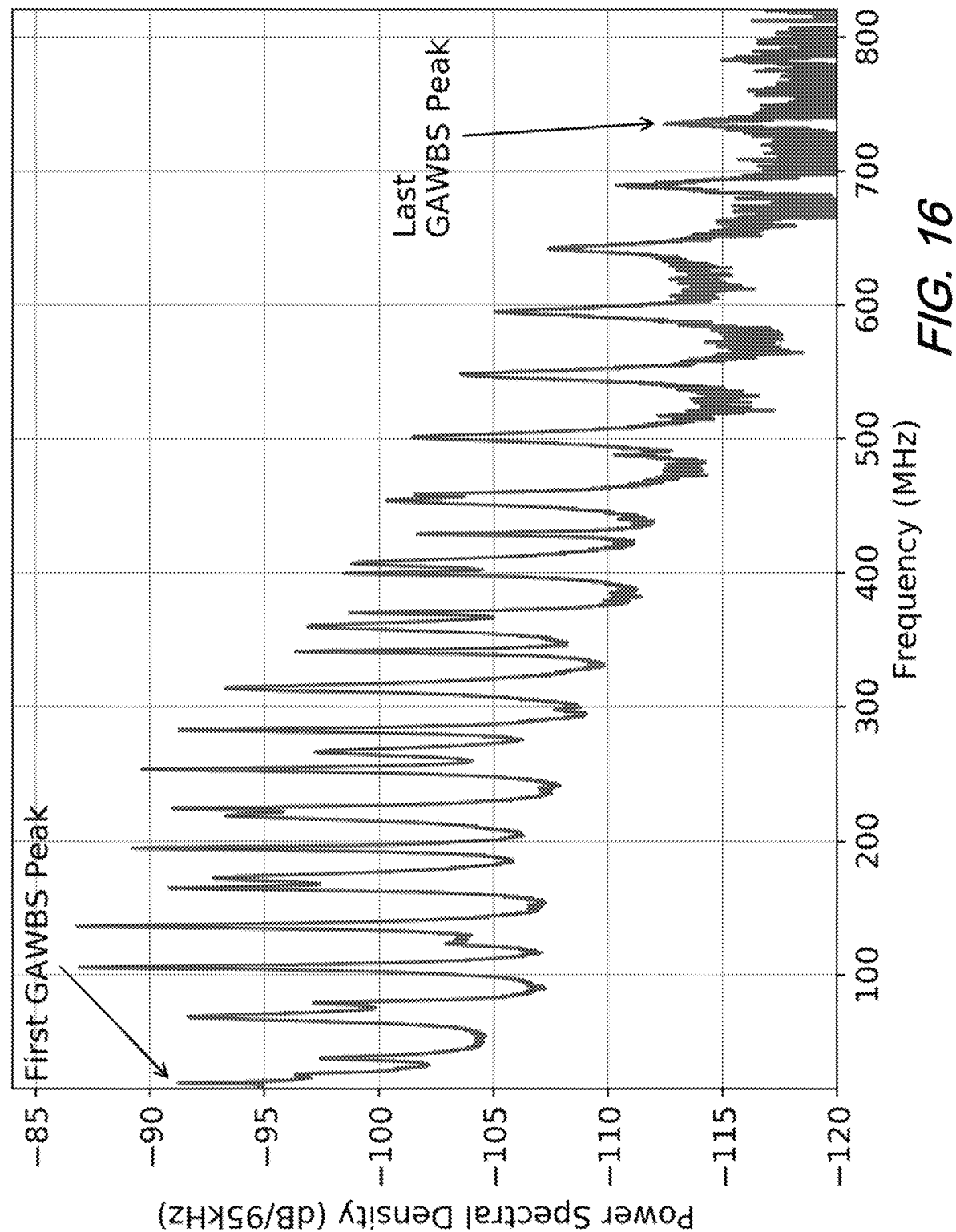
FIG. 16 is a plot showing GAWBS noise measured in a polarization orthogonal to that of the carrier, according to aspects of the present disclosure.

FIG. 16 is a plot showing GAWBS noise measured in a polarization orthogonal to that of the carrier, according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. An arrangement for measuring guided acoustic Brillouin scattering (GAWBS) noise comprising:
a first laser configured to emit first laser light and a second laser configured to emit second laser light;
a first length of optical fiber that optically connects the first laser light to a first port of a coherent receiver;
a second length of optical fiber that optically connects the second laser light to a second port of the coherent receiver; and
a third length of optical fiber that optically connects the first length of optical fiber to the second length optical fiber such that a portion of the first laser light is redirected to the second length of optical fiber wherein it is mixed with the second laser light resulting in mixed laser light;
a fiber under test (FUT) that receives the mixed laser light from a section of the second length of optical fiber such that it is directed to the second port of the coherent receiver via another portion of the second optical fiber; and
the coherent receiver that generates 4 beating signals from light signals received at the first and second ports;
wherein the arrangement is configured to suppress a large carrier using band-pass filters and further configured such that the second laser light emitted from the second laser is outside of a GUIDED ACOUSTIC BRILLOUIN SCATTERING (GAWBS) window and both polarization components of GAWBS are simultaneously measured.

2. The arrangement of claim 1 further comprising:
an optical amplifier interposed between the FUT and the second port of the coherent receiver for amplifying the mixed laser light after it traverses the FUT.

3. The arrangement of claim 2 further comprising:
an optical band pass filter interposed between the optical amplifier and the second port of the coherent receiver.

4. The arrangement of claim 3 further comprising a polarization controller interposed between the band pass filter and the second port of the coherent receiver.

5. The arrangement of claim 3 wherein the first port of the coherent receiver is a local oscillator port.

6. The arrangement of claim 5 wherein the second port of the coherent receiver is an optical signal port.

7. The arrangement of claim 6 wherein the coherent receiver comprises a hybrid that receives as input local oscillator light and signal port light and generates 4 quadrature signals.

8. The arrangement of claim 7 further comprising 4 balanced photodiodes for respectively detecting the 4 quadrature signals.

9. The arrangement of claim 8 further comprising an analog to digital converter configured to sample the output of the 4 balanced photodiodes and digitize same.

10. The arrangement of claim 9 further comprising 4 band pass filters each one respectively interposed between a respective photodiode and an input port of the analog to digital converter.

11. The arrangement of claim 9 further comprising a polarization controller (PC) interposed between the bandpass filter and the coherent receiver along the length of the second length of optical fiber.

12. The arrangement of claim 1 wherein the first length of optical fiber is a polarization maintaining (PM) fiber.

* * * * *